United States Patent
Bellman et al.

(10) Patent No.: US 10,401,539 B2
(45) Date of Patent: Sep. 3, 2019

(54) COATED ARTICLES WITH LIGHT-ALTERING FEATURES AND METHODS FOR THE PRODUCTION THEREOF

(71) Applicant: CORNING INCORPORATED, Corning, NY (US)

(72) Inventors: Robert Alan Bellman, Painted Post, NY (US); Shandon Dee Hart, Corning, NY (US); Karl William Koch, III, Elmira, NY (US)

(73) Assignee: CORNING INCORPORATED, Corning, NY (US)

( * ) Notice: Subject to any disclaimer, the term of this patent is extended or adjusted under 35 U.S.C. 154(b) by 95 days.

(21) Appl. No.: 15/468,795

(22) Filed: Mar. 24, 2017

(65) Prior Publication Data
US 2017/0307790 A1    Oct. 26, 2017

Related U.S. Application Data

(60) Provisional application No. 62/325,543, filed on Apr. 21, 2016.

(51) Int. Cl.
*G02B 5/02* (2006.01)
*C03C 17/22* (2006.01)
(Continued)

(52) U.S. Cl.
CPC ............ *G02B 5/0242* (2013.01); *C03C 17/22* (2013.01); *C03C 17/3452* (2013.01);
(Continued)

(58) Field of Classification Search
CPC ......... G02F 1/133504; G02F 1/133606; G02B 5/02; G02B 5/0242; G02B 1/14;
(Continued)

(56) References Cited

U.S. PATENT DOCUMENTS 7,426,328 B2    9/2008    Zhou et al.
8,312,739 B2    11/2012   Lee et al.
(Continued)

FOREIGN PATENT DOCUMENTS

WO    2014028267 A1    2/2014
WO    2015175390 A1    11/2015

OTHER PUBLICATIONS

Southwell, "Coating design using very thin high-and low-index layers," Applied Optics, vol. 24, Issue 4, pp. 457, (1985).
(Continued)

*Primary Examiner* — Kristina M Deherrera
(74) *Attorney, Agent, or Firm* — Kevin M. Johnson

(57) ABSTRACT

According to one or more embodiments described herein, a coated article may comprise a transparent substrate and an optical coating. The transparent substrate may have a major surface, and the optical coating may be disposed on the major surface of the transparent substrate and form an air-side surface. The optical coating may comprise one or more layers of deposited material and one or more light-altering features which may reduce oscillations in the reflectance spectrum of the coated article. The coated article may exhibit a maximum hardness of about 8 GPa or greater, have an average photopic transmittance of about 50% or greater, and exhibit an angular color shift of less than about 10 from a reference illumination angle in a range of 0-10 degrees to an incident illumination angle in a range of 30-60 degrees relative to the air-side surface.

11 Claims, 9 Drawing Sheets

(51) Int. Cl.
  *G02B 1/14* (2015.01)
  *C03C 17/34* (2006.01)
  *C09D 5/00* (2006.01)
  *G02B 1/18* (2015.01)

(52) U.S. Cl.
  CPC .............. *C09D 5/006* (2013.01); *G02B 1/14* (2015.01); *G02B 5/021* (2013.01); *G02B 5/0221* (2013.01); *G02B 5/0226* (2013.01); *G02B 5/0236* (2013.01); *G02B 5/0278* (2013.01); *G02B 5/0294* (2013.01); *C03C 2217/734* (2013.01); *C03C 2217/77* (2013.01); *C03C 2217/78* (2013.01); *G02B 1/18* (2015.01)

(58) Field of Classification Search
  CPC ................ C03C 17/22; C03C 2217/77; C03C 2217/734; C03C 2217/78
  USPC .......................................................... 359/599
  See application file for complete search history.

(56) References Cited

U.S. PATENT DOCUMENTS

| | | | |
|---|---|---|---|
| 8,561,429 | B2 | 10/2013 | Allan et al. |
| 9,359,261 | B2 | 6/2016 | Bellman et al. |
| 9,588,263 | B2 | 3/2017 | Gollier et al. |
| 2007/0285776 | A1 | 12/2007 | Nakamura et al. |
| 2009/0267270 | A1 | 10/2009 | Murakami et al. |
| 2011/0025948 | A1* | 2/2011 | Laney .................. G02B 5/0226 349/64 |
| 2013/0098438 | A1* | 4/2013 | Kawai .................... H01L 31/055 136/256 |
| 2014/0113083 | A1 | 4/2014 | Lee et al. |
| 2014/0334006 | A1 | 11/2014 | Adib et al. |

OTHER PUBLICATIONS

ASTM 1422C-99, "Standard Specification for Chemically Strengthened Flat Glass," downloaded Mar. 22, 2017.

ASTM 1279.19779 "Standard Test Method for Non-Destructive Photoelastic Measurement of Edge and Surface Stresses in Annealed, Heat-Strengthened, and Fully-Tempered Flat Glass," downloaded Mar. 22, 2017.

ASTM standard C770-98 (2008), "Standard Test Method for Measurement of Glass Stress-Optical Coefficient," downloaded Mar. 22, 2017.

Oliver, W.C.; Pharr, G. M. An improved technique for determining hardness and elastic modulus using load and displacement sensing indentation experiments. J. Mater. Res., vol. 7, No. 6, 1992, 1564-1583.

Oliver, W.C.; Pharr, G.M. Measurement of Hardness and Elastic Modulus by Instrument Indentation: Advances in Understanding and Refinements to Methodology. J. Mater. Res., vol. 19, No. 1, 2004, 3-20.

International Search Report and Written Opinion PCT/US2017/028273 dated Jul. 7, 2017.

\* cited by examiner

COATED ARTICLES WITH LIGHT-ALTERING FEATURES AND METHODS FOR THE PRODUCTION THEREOF

CROSS-REFERENCE TO RELATED APPLICATIONS

This application claims the benefit of priority under 35 U.S.C. § 119 of U.S. Provisional Application Ser. No. 62/325,543 filed on Apr. 21, 2016 the content of which is relied upon and incorporated herein by reference in its entirety.

BACKGROUND

This disclosure relates to coated articles and methods for making the same and, more particularly, to coated articles having durable and/or scratch-resistant optical coatings on transparent substrates.

Cover articles are often used to protect critical devices within electronic products, to provide a user interface for input and/or display, and/or many other functions. Such products include mobile devices, such as smart phones, mp3 players, and computer tablets. Cover articles also include architectural articles, transportation articles (e.g., articles used in automotive applications, trains, aircraft, sea craft, etc.), appliance articles, or any article that requires some transparency, scratch-resistance, abrasion resistance, or a combination thereof. These applications often demand scratch-resistance and strong optical performance characteristics, in terms of maximum light transmittance and minimum reflectance. Furthermore, some cover applications require that the color exhibited or perceived, in reflection and/or transmittance, does not change appreciably as the viewing angle is changed. In display applications, this is because, if the color in reflection or transmission changes with viewing angle to an appreciable degree, the user of the product will perceive a change in color or brightness of the display, which can diminish the perceived quality of the display. In other applications, changes in color may negatively impact the aesthetic requirements or other functional requirements.

The optical performance of cover articles can be improved by using various anti-reflective coatings; however known anti-reflective coatings are susceptible to wear or abrasion. Such abrasion can compromise any optical performance improvements achieved by the anti-reflective coating. For example, optical filters are often made from multilayer coatings having differing refractive indices and made from optically transparent dielectric material (e.g., oxides, nitrides, and fluorides). Most of the typical oxides used for such optical filters are wide band-gap materials, which do not have the requisite mechanical properties, such as hardness, for use in mobile devices, architectural articles, transportation articles or appliance articles.

Abrasion damage can include reciprocating sliding contact from counter face objects (e.g., fingers). In addition, abrasion damage can generate heat, which can degrade chemical bonds in the film materials and cause flaking and other types of damage to the cover glass. Since abrasion damage is often experienced over a longer term than the single events that cause scratches, the coating materials experiencing abrasion damage can also oxidize, which can further degrades the durability of the coating.

Known anti-reflective coatings are also susceptible to scratch damage and, often, are even more susceptible to scratch damage than the underlying substrates on which such coatings are disposed. In some instances, a significant portion of such scratch damage includes microductile scratches, which typically include a single groove in a material having extended length and with depths in the range from about 100 nm to about 500 nm. Microductile scratches may be accompanied by other types of visible damage, such as sub-surface cracking, frictive cracking, chipping and/or wear. Evidence suggests that a majority of such scratches and other visible damage is caused by sharp contact that occurs in a single contact event. Once a significant scratch appears on the cover substrate, the appearance of the article is degraded since the scratch causes an increase in light scattering, which may cause significant reduction in brightness, clarity and contrast of images on the display. Significant scratches can also affect the accuracy and reliability of articles including touch sensitive displays. Single event scratch damage can be contrasted with abrasion damage. Single event scratch damage is not caused by multiple contact events, such as reciprocating sliding contact from hard counter face objects (e.g., sand, gravel and sandpaper), nor does it typically generate heat, which can degrade chemical bonds in the film materials and cause flaking and other types of damage. In addition, single event scratching typically does not cause oxidization or involve the same conditions that cause abrasion damage and therefore, the solutions often utilized to prevent abrasion damage may not also prevent scratches. Moreover, known scratch and abrasion damage solutions often compromise the optical properties.

SUMMARY

According to a first aspect, a coated article is provided. The article includes: a transparent substrate having a major surface; an optical coating disposed on the major surface of the transparent substrate and forming an air-side surface, the optical coating comprising one or more layers of deposited material and at least one light-altering feature which reduces oscillations in the reflectance spectrum of the coated article by reducing the coherence of optical waves propagating through or reflected by the coated article; wherein the coated article exhibits a maximum hardness of about 8 GPa or greater as measured on the air-side surface by a Berkovich Indenter Hardness Test along an indentation depth of about 50 nm or greater; wherein the coated article has an average photopic transmittance of about 50% or greater; and wherein the article transmittance color coordinates in the L*a*b* colorimetry system under an International Commission on Illumination illuminant of the coated article exhibits an angular color shift of less than about 10 from an reference illumination angle in the range of 0-10 degrees to an incident illumination angle in the range of 30-60 degrees relative to the air-side surface, where the angular color shift is defined by $\sqrt{((a^*_2-a^*_1)2+(b^*_2-b^*_1)2)}$, wherein $a^*_1$, and $b^*_1$ represent the a* and b* coordinates when viewed at a reference illumination angle in the range of 0-10 degrees, and $a^*_2$, and $b^*_2$ represent the a* and b* coordinates when viewed at an incident illumination angle in the range of 30-60 degrees.

In a second aspect according to the first aspect, wherein the at least one light-altering feature comprises at least one of a rough interface between two adjacent layers in the optical coating; a rough interface between a layer of the optical coating and the substrate; and a rough air-side surface.

In a third aspect according to the second aspect, wherein the roughness is characterized by $R_a$ of 5 nm or greater.

In a fourth aspect according to the second aspect, wherein the roughness is characterized by $R_q$ of 5 nm or greater.

In a fifth aspect according to any one of the first through fourth aspects, wherein the at least one light-altering feature comprises light-scattering members disposed between two adjacent layers in the optical coating or between the optical coating and the substrate.

In a sixth aspect according to any one of the first through fifth aspects, wherein at least one light-altering feature comprises light-scattering members disposed in a layer of the optical coating.

In a seventh aspect according to the fifth or six aspect, wherein the light-scattering members have an average maximum dimension of from about 1 nm to about 1 micron.

In an eighth aspect according to any one of the fifth through seventh aspects, wherein at least some of the light-scattering members are solid particles.

In a ninth aspect according to any one of the first through eighth aspects, wherein the substrate comprises an amorphous substrate or a crystalline substrate.

In a tenth aspect according to any one of the first through ninth aspects, wherein the article transmittance color coordinates in the L*a*b* colorimetry system at normal incidence under an International Commission on Illumination illuminant exhibits a reference point color shift of less than about 10 from a reference point as measured at the air-side surface, the reference point comprising the color coordinates (a*=0, b*=0), (a*=−2, b*=−2), or the transmittance color coordinates of the substrate, wherein: when the reference point is the color coordinates (a*=0, b*=0), the color shift is defined by $\sqrt{((a^*_{article})^2 \; (b^*_{article})^2)}$; when the reference point is the color coordinates (a*=−2, b*=−2), the color shift is defined by $\sqrt{((a^*_{article}+2)^2+(b^*_{article}+2)^2)}$; and when the reference point is the color coordinates of the substrate, the color shift is defined by $\sqrt{((a^*_{article}-a^*_{substrate})^2 + (b^*_{article} \; b^*_{substrate})^2)}$.

In an eleventh aspect according to any one of the first through tenth aspects, wherein the coated article has a haze value of about 50% or less.

According to a twelfth aspect, a coated article is provided. The article includes: a transparent substrate having a major surface; an optical coating disposed on the major surface of the transparent substrate and forming an air-side surface, the optical coating comprising a scratch-resistant layer having a thickness of at least 300 nm, the scratch resistant layer comprising a material exhibiting a maximum hardness of about 8 GPa or greater as measured by a Berkovich Indenter Hardness Test along an indentation depth of about 50 nm or greater, the optical coating comprising at least one light-altering feature which reduces oscillations in the reflectance spectrum of the coated article by reducing the coherence of optical waves propagating through or reflected by the coated article, the light-altering features disposed in the scratch-resistant layer or at an interface formed by the scratch-resistant layer; wherein the coated article exhibits a maximum hardness of about 8 GPa or greater as measured on the air-side surface by a Berkovich Indenter Hardness Test along an indentation depth of about 50 nm and greater; wherein the coated article has an average photopic transmittance of about 50% or greater; and wherein the article transmittance color coordinates in the L*a*b* colorimetry system under an International Commission on Illumination illuminant of the coated article exhibits an angular color shift of less than about 10 from an reference illumination angle in the range of 0-10 degrees to an incident illumination angle in the range of 30-60 degrees relative to the air-side surface, where the angular color shift is defined by $\sqrt{((a^*_2-a^*_1)^2+(b^*_2-b^*_1)^2)}$, wherein a*1, and b*1 represent the a* and b* coordinates when viewed at a reference illumination angle in the range of 0-10 degrees, and $a^*_2$, and $b^*_2$ represent the a* and b* coordinates when viewed at an incident illumination angle in the range of 30-60 degrees.

In a thirteenth aspect according to the twelfth aspect, wherein the at least one light-altering feature comprises a rough interface formed by the scratch-resistant layer with another layer.

In a fourteenth aspect according to the twelfth or thirteenth aspect, wherein the at least one light-altering feature comprises light-scattering members disposed between the scratch-resistant layer and an adjacent layers in the optical coating.

In a fifteenth aspect according to any one of the twelfth through fourteenth aspects, wherein at least one light-altering feature comprises light-scattering members disposed in the scratch-resistant layer.

In a sixteenth aspect according to any one of the twelfth through fifteenth aspects, wherein the article transmittance color coordinates in the L*a*b* colorimetry system at normal incidence under an International Commission on Illumination illuminant exhibits a reference point color shift of less than about 10 from a reference point as measured at the air-side surface, the reference point comprising the color coordinates (a*=0, b*=0), (a*=−2, b*=−2), or the transmittance color coordinates of the substrate, wherein: when the reference point is the color coordinates (a*=0, b*=0), the color shift is defined by $\sqrt{((a^*_{article})^2 \; (b^*_{article}))}$; when the reference point is the color coordinates (a*=−2, b*=−2), the color shift is defined by $\sqrt{(a^*_{article}+2)^2+(b^*_{article}+2)^2)}$; and when the reference point is the color coordinates of the substrate, the color shift is defined by $\sqrt{((a^*_{article}-a^*_{substrate})^2 (b^*_{article}-b^*_{substrate})^2)}$.

According to a seventeenth aspect, a coated article is provided. The article includes: a transparent substrate having a major surface; an optical coating disposed on the major surface of the transparent substrate and forming an air-side surface, wherein the optical coating comprises a first layer and a scratch-resistant layer, the first layer adjacent the transparent substrate and having a refractive index within 0.1 of the transparent substrate, and the scratch-resistant layer deposited over the first layer and having a thickness of at least 300 nm and comprising a material exhibiting a maximum hardness of about 8 GPa or greater as measured by a Berkovich Indenter Hardness Test along an indentation depth of about 50 nm and greater, the optical coating comprising at least one light-altering feature which reduces oscillations in the reflectance spectrum of the coated article by reducing the coherence of optical waves propagating through or reflected by the coated article, the light-altering features disposed in the scratch-resistant layer or at an interface formed by the scratch-resistant layer and the first layer; wherein the coated article exhibits a maximum hardness of about 8 GPa or greater as measured on the air-side surface by a Berkovich Indenter Hardness Test along an indentation depth of about 50 nm and greater; wherein the coated article has an average photopic transmittance of about 50% or greater; and wherein the article transmittance color coordinates in the L*a*b* colorimetry system under an International Commission on Illumination illuminant of the coated article exhibits an angular color shift of less than about 10 from an reference illumination angle in the range of 0-10 degrees to an incident illumination angle in the range of 30-60 degrees relative to the air-side surface, where the angular color shift is defined by $\sqrt{(a^*_2-a^*_1)^2+(b^*_2-b^*_1)^2)}$, wherein $a^*_1$, and $b^*_1$ represent the a* and b* coordinates when viewed at a reference illumination angle in the range of 0-10 degrees, and $a^*_2$, and $b^*_2$ represent the a* and b* coordinates when viewed at an incident illumination angle in the range of 30-60 degrees.

In an eighteenth aspect according to the seventeenth aspect, wherein the first layer comprises $BaF_2$.

In a nineteenth aspect according to the seventeenth or eighteenth aspect, wherein the at least one light-altering feature comprises a rough interface between the scratch-resistant layer and the first layer.

In a twentieth aspect according to any one of the seventeenth through nineteenth aspects, wherein the article transmittance color coordinates in the L*a*b* colorimetry system at normal incidence under an International Commission on Illumination illuminant exhibits a reference point color shift of less than about 10 from a reference point as measured at the air-side surface, the reference point comprising the color coordinates (a*=0, b*=0), (a*=−2, b*=−2), or the transmittance color coordinates of the substrate, wherein: when the reference point is the color coordinates (a*=0, b*=0), the color shift is defined by $\sqrt{((a^*_{article})^2 (b^*_{article})^2)}$; when the reference point is the color coordinates (a*=−2, b*=−2), the color shift is defined by $\sqrt{((a^*_{article}+2)^2+(b^*_{article}+2)^2)}$; and when the reference point is the color coordinates of the substrate, the color shift is defined by $\sqrt{((a^*_{article}-a^*_{substrate})^2+(b^*_{article}-b^*_{substrate})^2)}$.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1:
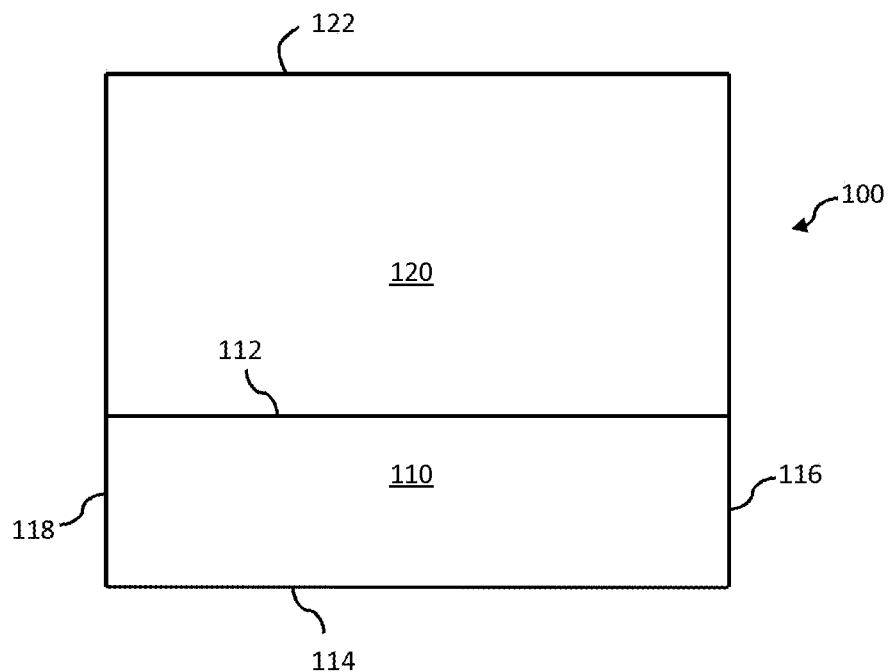
FIG. 1 is a cross-sectional side view of a coated article, according to one or more embodiments described herein.

Reference will now be made in detail to various embodiments, examples of which are illustrated in the accompanying drawings. Described herein are embodiments of coated articles which include optical coatings (which may comprise one or more discrete layers) disposed on substrates. The optical coatings include one or more light-altering features. The light-altering features incorporated into the optical coatings may reduce reflectance oscillations, reduce visible color, and/or reduce angular color shift, as described herein. Light-altering features which may be included in the optical coatings described herein may include light-scattering structural elements such as, without limitation, roughness at a layer interface or the inclusion of light-scattering members in or at an edge of a layer of an optical coating. Rough interfaces of layers and light-scattering members may scatter light in the optical coating such that optical inference from reflections throughout the coated article are non-coherent, causing reduced oscillations in the reflectance and/or transmittance spectrum of the coated article.

Generally, some reflectance may be present at the interface between any two layers in a coated article which do not have the same refractive index. In embodiments of coated articles, this may include the interface between an optical coating with air, the interface between an optical coating with the substrate it is deposited upon, and the interfaces between any two layers of an optical coating. The reflectance from each interface contributes to the total reflectance spectrum of the coated article. In some embodiments of coated articles, the reflected, transmitted, or incident light waves interacting with two or more interfaces of a coated article may be coherent by having a fixed or well-defined relationship in frequency, phase, polarization, space, time, or a combination of these parameters, and this fixed or well-defined relationship is maintained over an extent of space and time that is large enough to be noticed by an observer. For example, the reflectance spectrum produced by two different interfaces may have a similar wavelength, and each reflectance spectrum may constructively contribute to the total reflectance spectrum of the coated article. The interfaces producing the coherent interference may be from a single layer in an optical coating, or from two or more interfaces of a coated article which do not share a common layer.

When two or more interfering reflected waves from an optical coating are coherent, oscillations in the reflectance spectrum of the coated article may be present. For example, the coherent reflected waves may cause constructive interference which increases the magnitude of reflectance oscillations. Such oscillations in the reflectance spectrum may cause undesirable, perceivable color in reflectance and/or transmittance, especially when the coated article is viewed at a non-normal angle of incidence or when the viewing angle changes.

According to one or more embodiments, the coherence of the reflected waves may be reduced or substantially eliminated by the inclusion of one or more light-altering features incorporated into an optical coating. The light-altering features may disrupt the reflectance of a coated article as to disrupt the coherence of reflected waves, which reduces measurable interference patterns that may create a perceivable color in the coated article when viewed at normal or non-normal angles. This disruption may be accomplished by at least the scattering of reflective waves from one or more interfaces, or the change in phase of the reflective waves from a particular interface.

In some embodiments, undesirable constructive interference may be particularly caused by coherent reflected waves from the interfaces at the air-side and substrate-side of a single layer of an optical coating referred to herein as a "scratch-resistant" layer. In embodiments described herein, one or more scratch-resistant layers may be included in an optical coating. These scratch-resistant layers may be relatively thick (such as greater than about 300 nm, and up to 10 micron) and hard (such as having a Berkovich hardness of greater than 8 GPa). These scratch-resistant layers may impart desirable physical characteristics upon the coated article such as increased hardness and resistance to abrasive wear. However, they may produce coherent reflected waves at their air-side and substrate-side interfaces with other layers, causing increased reflective oscillations due to interference. In one or more embodiments, light-altering features may be provided in an optical coating in or at the edge of a scratch-resistant layer.

Referring to FIG. 1, a coated article 100 according to one or more embodiments may include a substrate 110, and an optical coating 120 disposed on the substrate 110. The substrate 110 includes opposing major surfaces 112, 114 and opposing minor surfaces 116, 118. The optical coating 120 is shown in FIG. 1 as disposed on a first opposing major surface 112; however, the optical coating 120 may be disposed on the second opposing major surface 114 and/or one or both of the opposing minor surfaces 116, 118, in addition to or instead of being disposed on the first opposing major surface 112. The optical coating 120 forms an air-side surface 122. One or more light-altering features may be provided in the optical coating 120, embodiments of which are described herein.

The optical coating 120 includes at least one layer of at least one material. The term "layer" may include a single layer or may include one or more sub-layers. Such sub-layers may be in direct contact with one another. The sub-layers may be formed from the same material or two or more different materials. In one or more alternative embodiments, such sub-layers may have intervening layers of different materials disposed therebetween. In one or more embodiments, a layer may include one or more contiguous and uninterrupted layers and/or one or more discontinuous and interrupted layers (i.e., a layer having different materials formed adjacent to one another). A layer or sub-layer may be formed by any known method in the art, including discrete deposition or continuous deposition processes. In one or more embodiments, the layer may be formed using only continuous deposition processes, or, alternatively, only discrete deposition processes.

As used herein, the term "dispose" includes coating, depositing, and/or forming a material onto a surface using any known or to be developed method in the art. The disposed material may constitute a layer, as defined herein. As used herein, the phrase "disposed on" includes forming a material onto a surface such that the material is in direct contact with the surface, or alternatively includes embodiments where the material is formed on a surface with one or more intervening material(s) disposed between material and the surface. The intervening material(s) may constitute a layer, as defined herein.

In one or more embodiments, a single layer or multiple layers of the optical coating 120 may be deposited onto the substrate 110 by a vacuum deposition technique such as, for example, chemical vapor deposition (e.g., plasma enhanced chemical vapor deposition (PECVD), low-pressure chemical vapor deposition, atmospheric pressure chemical vapor deposition, and plasma-enhanced atmospheric pressure chemical vapor deposition), physical vapor deposition (e.g., reactive or nonreactive sputtering or laser ablation), thermal or e-beam evaporation and/or atomic layer deposition. Liquid-based methods may also be used such as spraying, dipping, spin coating, or slot coating (e.g., using sol-gel materials). Generally, vapor deposition techniques may include a variety of vacuum deposition methods which can be used to produce thin films. For example, physical vapor deposition uses a physical process (such as heating or sputtering) to produce a vapor of material, which is then deposited on the object which is coated.

The optical coating 120 may have thickness of from about 100 nm to about 10 microns, For example, the optical coating may have a thickness greater than or equal to about 200 nm, 300 nm, 400 nm, 500 nm, 600 nm, 700 nm, 800 nm, 900 nm, 1 micron, 2 microns, 3 microns, 4 microns, 5 microns, 6 microns, 7 microns, or even 8 microns, and less than or equal to about 10 microns.

Figure 2A:
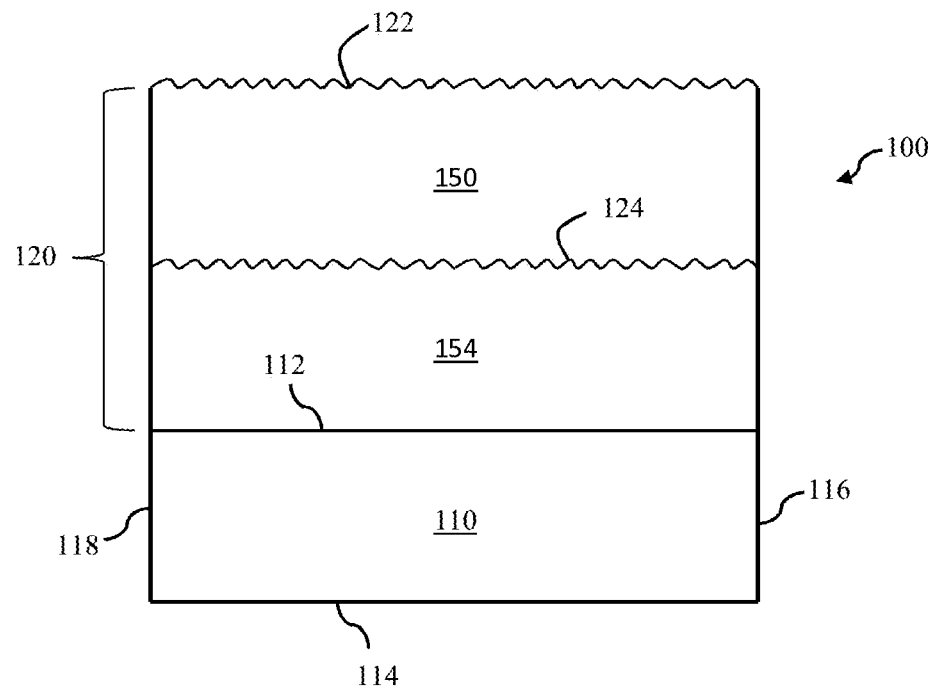
FIG. 2A is a cross-sectional side view of a coated article, according to one or more embodiments described herein.

In one or more embodiments, the optical coating 120 may include, or consist of, a scratch-resistant layer. Referring now to FIG. 2A, a coated article 100 is depicted which includes a scratch-resistant layer 150 disposed over an underlying layer 154. According to one embodiment, the scratch-resistant layer 150 may comprise one or more materials chosen from $Si_uAl_vO_xN_y$, $Ta_2O_5$, $Nb_2O_5$, AlN, $Si_3N_4$, $AlO_xN_y$, $SiO_xN_y$, $SiN_x$, $SiN_x:H_y$, $HfO_2$, $TiO_2$, $ZrO_2$, $Y_2O_3$, $Al_2O_3$, $MoO_3$, diamond-like carbon, or combinations thereof. Exemplary materials used in the scratch-resistant layer 150 may include an inorganic carbide, nitride, oxide, diamond-like material, or combination thereof. Examples of suitable materials for the scratch-resistant layer 150 include metal oxides, metal nitrides, metal oxynitride, metal carbides, metal oxycarbides, and/or combinations thereof. Exemplary metals include B, Al, Si, Ti, V, Cr, Y, Zr, Nb, Mo, Sn, Hf, Ta and W. Specific examples of materials that may be utilized in the scratch-resistant layer 150 may include $Al_2O_3$, AlN, $AlO_xN_y$, $Si_3N_4$, $SiO_xN_y$, $Si_uAl_vO_xN_y$, diamond, diamond-like carbon, $Si_xC_y$, $Si_xO_yC_z$, $ZrO_2$, $TiO_xN_y$, and combinations thereof. The scratch-resistant layer 150 may also comprise nanocomposite materials, or materials with a controlled microstructure, to improve hardness, toughness, or abrasion/wear resistance. For example the scratch-resistant layer 150 may comprise nanocrystallites in the size range from about 5 nm to about 30 nm. In embodiments, the scratch-resistant layer 150 may comprise transformation-toughened zirconia, partially stabilized zirconia, or zirconia-toughened alumina. In embodiments, the scratch-resistant layer 150 exhibits a fracture toughness value greater than about 1 MPa√m and simultaneously exhibits a hardness value greater than about 8 GPa.

In one or more embodiments, the scratch-resistant layer 150 may comprise a compositional gradient. For example, a scratch-resistant layer 150 may include a compositional gradient of $Si_uAl_vO_xN_y$, where the concentration of any one or more of Si, Al, O and N are varied to increase or decrease the refractive index. The refractive index gradient may also be formed using porosity. Such gradients are more fully described in U.S. patent application Ser. No. 14/262,224, entitled "Scratch-Resistant Articles with a Gradient Layer", filed on Apr. 28, 2014, which is hereby incorporated by reference in its entirety.

The scratch-resistant layer 150 may be relatively thick as compared with other layers, such as greater than or equal to about 300 nm, 400 nm, 500 nm, 600 nm, 700 nm, 800 nm, 900 nm, 1 micron, 2 microns, 3 microns, 4 microns, 5 microns, 6 microns, 7 microns, or even 8 microns. For example a scratch-resistant layer may have a thickness from about 300 nm to about 10 microns.

In one or more embodiments, the underlying layer 154 may be comprised of a material having a refractive index similar to that of the substrate 110. For example, the underlying layer 154 may have a refractive index within about 0.1, 0.05, or even within 0.01 of the refractive index of the substrate 110. Materials of the underlying layer 154 may depend on the composition of the substrate 110, but in embodiments where the substrate is glass, $BaF_2$ may be a suitable material for the underlying layer 154. Matching the refractive index of the underlying layer 154 with the refractive index of the substrate 110 may reduce reflections originating at the substrate surface 112.

The optical coatings described herein may comprise one or more light-altering features. For example, as schematically shown in FIG. 2A, the optical coating 120 may comprise a rough interface 124 between two adjacent layers in the optical coating, such as the underlying layer 154 and the scratch-resistant layer 150. Other interfaces of coated article 100 may be rough, such as the interfaces at the substrate surface 112 (not depicted as rough in FIG. 2A) and at the air-side surface 122 of the optical coating 120. In one or more embodiments, the rough interface may be characterized by its arithmetic average roughness ($R_a$) or its root mean squared roughness ($R_q$). $R_a$ and $R_q$ may be determined from the formulas:

$$R_a = \frac{1}{n}\sum_{i=1}^{n} |y_i|, R_q = \sqrt{\frac{1}{n}\sum_{i=1}^{n} y_i^2}$$

where n represents the number of measurement locations and y represents the measured height. In one or more embodiments, a rough interface may have a $R_a$ greater than or equal to 5 nm, 10 nm, 15 nm, 20 nm, 25 nm, 30 nm, 35 nm or even 40 nm. In one or more embodiments, a rough interface may have a $R_q$ of greater than or equal to 5 nm, 10 nm, 15 nm, 20 nm, 25 nm, 30 nm, 35 nm or even 40 nm.

Figure 2B:
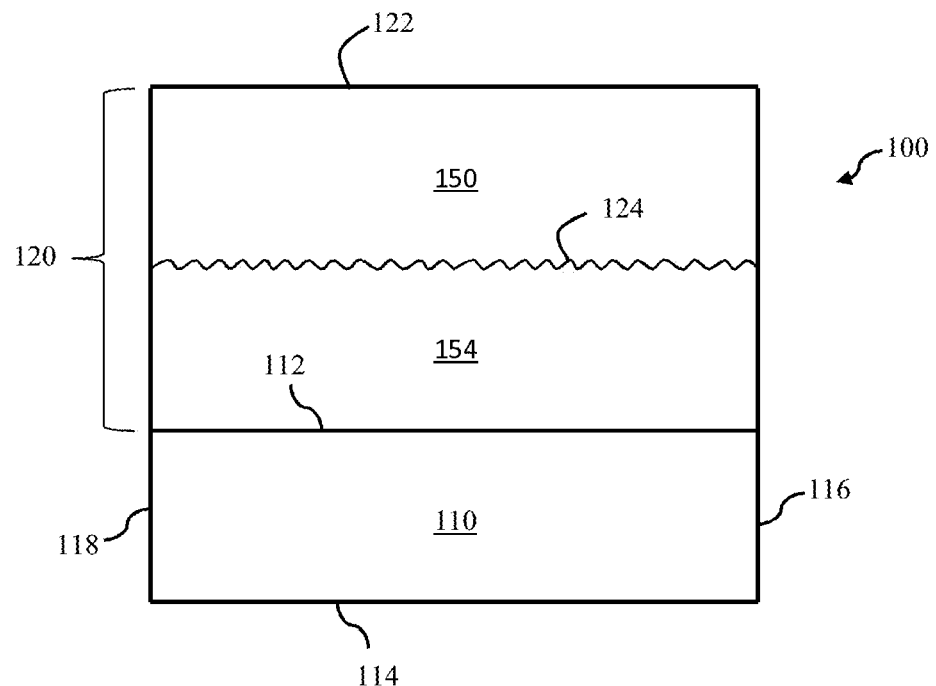
FIG. 2B is a cross-sectional side view of a coated article, according to one or more embodiments described herein.

According to embodiments, a rough interface may be produced by various methods such as, but not limiting to, growth of a crystal morphology in a layer which produces roughness, chemical processing such as chemical etching, or mechanical processing such as mechanical etching, cutting, tooling, etc. For example, in one embodiment, $BaF_2$ may be deposited as a layer of the optical coating 120, such as an underlying layer 154, having a crown type crystallite morphology. An embodiment of such a deposition of $BaF_2$ is explained in the Examples which follow. Following deposition, the top surface of the underlying layer 154 (at interface 124) may be rough, and another layer, such as the scratch-resistant layer 150, may be deposited over the underlying layer 154 at the rough interface 124. If the deposition of the scratch-resistant layer 150 is relatively consistent, then a rough surface may be present at the air-side surface 122, as shown in FIG. 2A. In another embodiment, the air-side surface 122 may be smooth. For example, the air-side surface 122 may be smoothed by polishing (chemical or mechanical) or by lamination, as depicted in the embodiment of FIG. 2B. In another embodiment, the air-side surface 122 may be smooth due to incorporating a coating process such as PECVD that is tuned to have a planarizing effect, thus leading to a smooth air-side surface 122 in the layer deposited on top of a rough buried interface.

It should be appreciated that rough or smooth layers may be deposited as any layer of an optical coating 120. For example, any interface in the coated article 100 may be made rough by, for example, the methods described herein such as growing a rough crystalline layer or growing a layer with consistent thickness over a rough interface. Rough interfaces may be made smooth by polishing or deposition techniques which promote planar surface formation.

In the embodiments depicted in FIG. 2A or 2B, if the underlying layer 154 has a similar or identical refractive index to the substrate 110, there will be little reflection at the major surface 112 of the substrate 110, and the far majority of the reflection will come from the air-side surface 122 and the rough interface 124. However, without being bound by theory, it is believed that the light scattering at the rough surface 124 causes the reflectance interference from the rough surface 124 and the air-side surface 122 to be less coherent or non-coherent, reducing oscillations in the reflectance and/or transmittance spectrum of the coated article 100.

Figure 3:
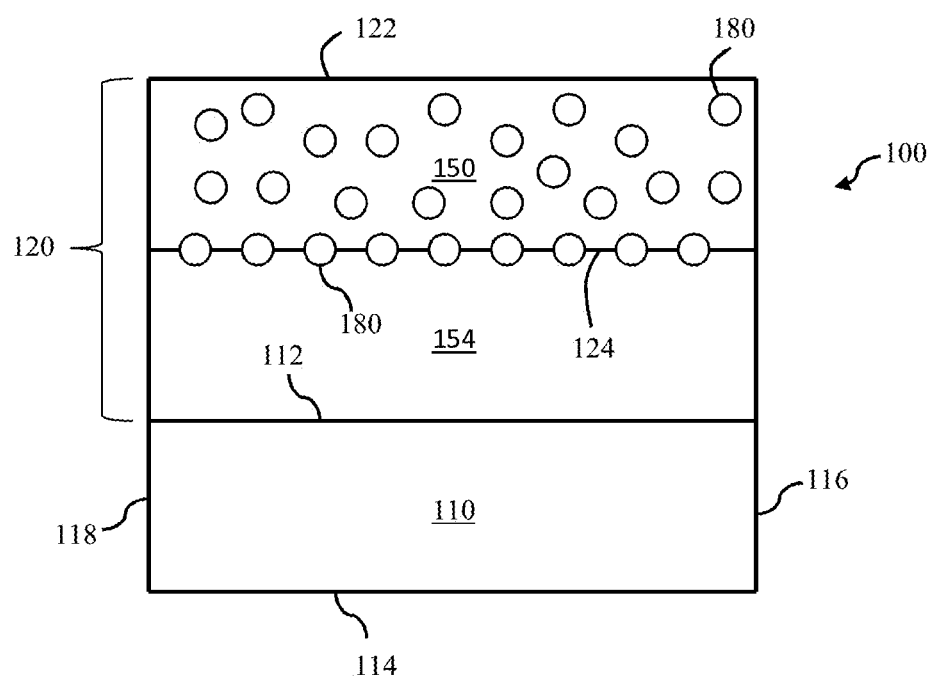
FIG. 3 is a cross-sectional side view of a coated article, according to one or more embodiments described herein.

In one or more embodiments, light-scattering members may be disposed in one or more layers or at one or more interfaces of the optical coating 120. For example, now referring to FIG. 3, light scattering members 180 may be disposed between two adjacent layers in the optical coating 120, such as the underlying layer 154 and the scratch-resistant layer 150. Also as depicted in FIG. 3, light-scattering members 180 may be disposed within a layer of the optical coating 120, such as the scratch-resistant layer 150. In some embodiments, light-scattering members 180 are disposed in the scratch-resistant layer but not at the layer interface 124, or vice versa.

As depicted in FIG. 3, the light-scattering members 180 may be substantially spherical in shape. However, in other embodiments, the light-scattering members 180 may have other shapes or form factors, such as irregularly shaped bodies having rounded or substantially flat surfaces, including particles comprising sharp angular features. The light-scattering members 180 may have varying sizes. In one embodiment, each light-scattering member 180 may have a maximum dimension of from about 1 nm to about 1 micron (such as from about 1 nm to about 900 nm, from about 1 nm to about 800 nm, from about 1 nm to about 700 nm, from about 1 nm to about 600 nm, from about 1 nm to about 500 nm, from about 1 nm to about 400 nm, from about 1 nm to about 300 nm, from about 1 nm to about 200 nm, from about 1 nm to about 100 nm, from about 1 nm to about 50 nm, or from about 1 nm to about 25 nm). As used herein, the "maximum dimension" refers to the greatest distance between surfaces of an individual light-scattering member 180 through the light-scattering member 180. For example, the maximum dimension of a spherical light-scattering member 180 is the diameter of the sphere. The "average maximum dimension" refers to the average of the maximum dimensions of all light-scattering members 180 of a glass article 100.

The light-scattering members 180 may comprise a composition or phase different from the other portions of the optical coating 120 adjacent to the light-scattering members 180. In embodiments, the light-scattering members 180 may comprise solids and/or gasses, or may comprise void spaces. It should further be understood that some of the light-scattering members 180 may have different compositions or phases from one another.

The light-scattering members 180 may have varying sizes and shapes, such that they affect light with different wavelengths differently. In one embodiment, light-scattering members 180 have a size distribution suitable to scatter light over the entire visible spectrum (i.e., light within the range from about 400 nm to about 700 nm). The amount of light-scattering particles may vary per surface area of the interface. However, it should be understood that the methods for producing coated articles 100 as described herein may be capable of controlling the size, shape, size distribution, and/or relative amount of the light-scattering members 180.

In additional embodiments, the light-altering features may comprise designed optical phase-modifying surfaces or interfaces such as gratings or metamaterial surfaces below, above, or within the high-index layer 150. For example, gratings may be positioned where rough interfaces are positioned in various embodiments described herein. As used herein, a "metamaterial" refers to structure comprised of a periodic arrangement of material elements in order to create desired electromagnetic properties. Electromagnetic properties arise from the periodic arrangement of atoms or molecules. Metamaterials may be produced, without limitation, by lithography or self assembly to create a periodic arrangement of matter to produce properties which are not found in nature.

In another embodiment, the light-altering features may comprise patterned or random variations in refractive index within, above, or below the scratch-resistant layer 150. These variations may cause redirection or phase modification of reflected or transmitted light. In one or more embodiments, the variations may cause primarily forward scattering, so as to minimize external reflected haze. For example, the underlying layer 154 may not comprise a discrete particle or interface. Rather, in some embodiments, the underlying layer 154 may comprise smooth or gradual changes in refractive index, with no apparent sharp interfaces, where the underlying layer 154 can also have spatial variations in refractive index, that can have, for example, a grating-like or scattering-like effect leading to changes in phase or local angular content of the reflected or transmitted light waves. Such is described in U.S. Pat. No. 9,588,263, which is incorporated by reference herein.

It should be understood that the light-altering features described herein, such as those described with reference to FIGS. 2 and 3 in a scratch-resistant layer, may be incorporated into other embodiments of optical coatings 120. For example, additional embodiments are provided herein with reference to FIGS. 4 and 5. The light-altering features described may be incorporated into the scratch-resistant layers 150 of the embodiments of FIGS. 4 and 5. However, it should be appreciated that the light-altering features described herein may be incorporated into many embodiments of coated articles 100 and particularly into scratch-resistant layers 150 of coated articles 100. The positioning of light-altering features described should not be limited to the embodiments of coated articles 100 specifically described herein, as they may be incorporated into any layer of any coated article 100.

The material of the light-scattering component may have a refractive index that is different from the adjacent materials of the optical coating 120. For example, the refractive index of the material of the light-scattering component 180 may be at least about 1%, at least about 2%, at least about 3%, at least about 4%, at least about 5%, at least about 10%, at least about 20%, at least about 30%, at least about 40%, or even at least about 50% different (i.e., greater than or less than) than the refractive index of the adjacent materials in the optical coating 120.

Figure 4:
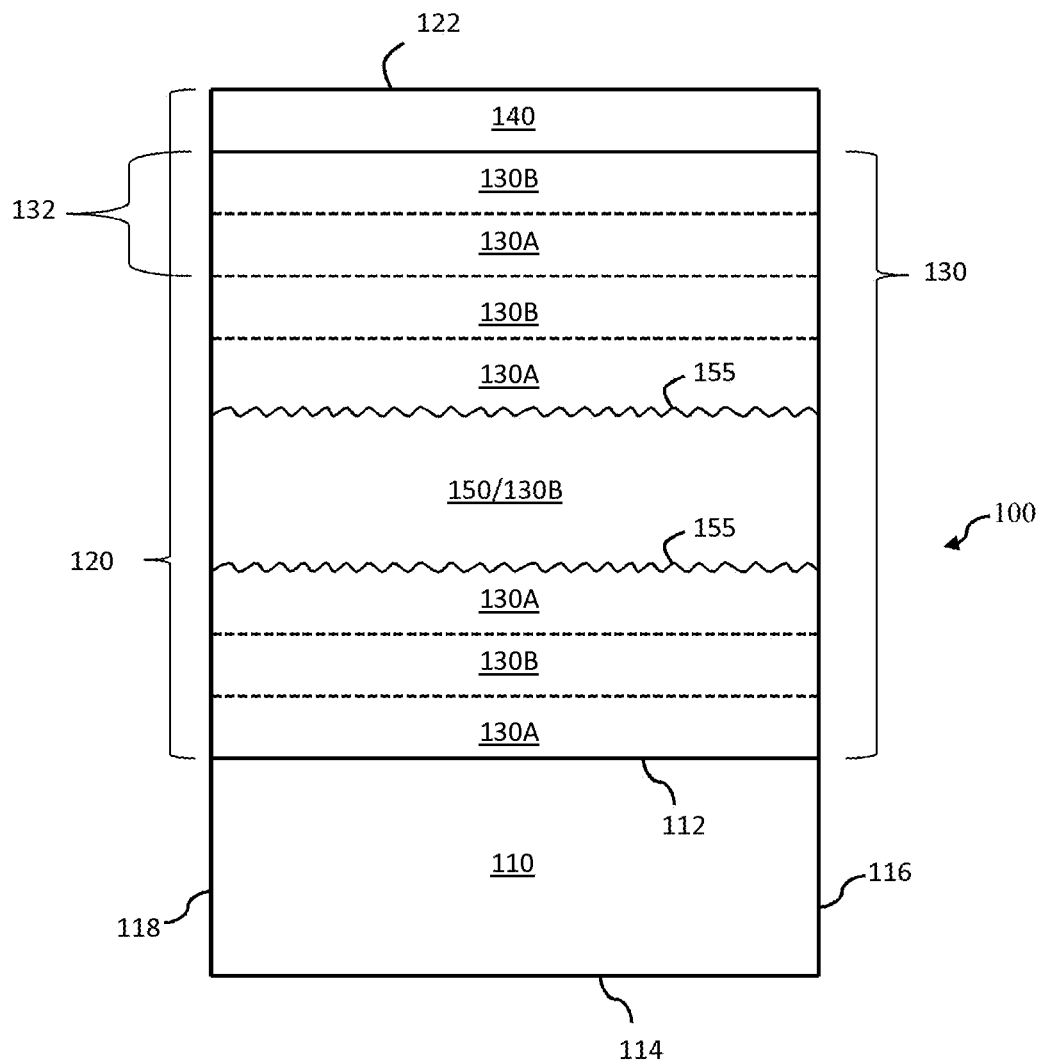
FIG. 4 is a cross-sectional side view of a coated article, according to one or more embodiments described herein.

In one or more embodiments, as shown in FIG. 4, the optical coating 120 may include an anti-reflective coating 130 which may include a plurality of layers (130A, 130B). In one or more embodiments, the anti-reflective coating 130 may include a period 132 comprising two layers, such as the low RI layer 130A and high RI layer 130B. As shown in FIG. 4, the anti-reflective coating 130 may include a plurality of periods 132. In other embodiments, a single period may include three layers such as a low RI layer, a medium RI layer, and a high RI layer. Throughout this disclosure, it should be understood that FIG. 4 is an example embodiment of an optical coating 120 having periods 132 and that that the properties (e.g., color, hardness, etc.) and materials of the optical coatings 120 described herein should not be limited to the embodiment of FIG. 4.

As used herein, the terms "low RI", "high RI" and "medium RI" refer to the relative values for the refractive index ("RI") to one another (i.e., low RI<medium RI<high RI). In one or more embodiments, the term "low RI", when used with the low RI layer, includes a range from about 1.3 to about 1.7 or 1.75. In one or more embodiments, the term "high RI", when used with the high RI layer, includes a range from about 1.7 to about 2.5 (e.g., about 1.85 or greater). In one or more embodiments, the term "medium RI", when used with a third layer of a period, includes a range from about 1.55 to about 1.8. In some embodiments, the ranges for low RI, high RI, and/or medium RI may overlap; however, in most instances, the layers of the anti-reflective coating 130 have the general relationship regarding RI of: low RI<medium RI<high RI (where "medium RI" is applicable in the case of a three layer period). In one or more embodiments, the difference in the refractive index of the low RI layer and the high RI layer may be about 0.01 or greater, about 0.05 or greater, about 0.1 or greater, or even about 0.2 or greater.

For example, in FIG. 4 the period 132 may include a low RI layer 130A and a high RI layer 130B. When a plurality of periods are included in the optical coating 120, the low RI layers 130A (designated as "L") and the high RI layers 130B (designated as "H") alternate in the following sequence of layers: L/H/L/H . . . or H/L/H/L . . . , such that the low RI layers and the high RI layers alternate along the physical thickness of the optical coating 120. In the embodiment depicted in FIG. 4, the anti-reflective coating 130 includes four periods 132, where each period 132 includes a low RI layer 130A and a high RI layer 130B. In some embodiments, the anti-reflective coating 130 may include up to 25 periods. For example, the anti-reflective coating 130 may include from about 2 to about 20 periods, from about 2 to about 15 periods, from about 2 to about 10 periods, from about 2 to about 12 periods, from about 3 to about 8 periods, or from about 3 to about 6 periods.

Example materials suitable for use in the anti-reflective coating 130 include, without limitation, $SiO_2$, $Al_2O_3$, $GeO_2$, SiO, $AlO_xN_y$, AlN, SiNx, $SiO_xN_y$, $Si_uAl_vO_xN_y$, $Ta_2O_5$, $Nb_2O_5$, $TiO_2$, $ZrO_2$, TiN, MgO, $MgF_2$, $BaF_2$, $CaF_2$, $SnO_2$, $HfO_2$, $Y_2O_3$, $MoO_3$, $DyF_3$, $YbF_3$, $YF_3$, $CeF_3$, polymers, fluoropolymers, plasma-polymerized polymers, siloxane polymers, silsesquioxanes, polyimides, fluorinated polyimides, polyetherimide, polyethersulfone, polyphenylsulfone, polycarbonate, polyethylene terephthalate, polyethylene naphthalate, acrylic polymers, urethane polymers, polymethylmethacrylate, other materials cited below as suitable for use in a scratch-resistant layer, and other materials known in the art. Some examples of suitable materials for use in a low RI layer 130A include, without limitation, $SiO_2$, $Al_2O_3$, $GeO_2$, SiO, $AlO_xN_y$, $SiO_xN_y$, $Si_uAl_vO_xN_y$, MgO, $MgAl_2O_4$, $MgF_2$, $BaF_2$, $CaF_2$, $DyF_3$, $YbF_3$, $YF_3$, and $CeF_3$. The nitrogen content of the materials for use in a low RI layer 130A may be minimized (e.g., in materials such as $Al_2O_3$ and $MgAl_2O_4$). Some examples of suitable materials for use in a high RI layer 130B include, without limitation, $Si_uAl_vO_xN_y$, $Ta_2O_5$, $Nb_2O_5$, AlN, $Si_3N_4$, $AlO_xN_y$, $SiO_xN_y$, $SiN_x$, $SiN_x$:$H_y$, $HfO_2$, $TiO_2$, $ZrO_2$, $Y_2O_3$, $Al_2O_3$, $MoO_3$, and diamond-like carbon. In one or more embodiments, the high RI layer 130B may have high hardness (e.g., hardness of greater than 8 GPa), and the high RI materials listed above may comprise high hardness and/or scratch resistance. The oxygen content of the materials for the high RI layer 130B may be minimized, especially in $SiN_x$ or $AlN_x$ materials. $AlO_xN_y$ materials may be considered to be oxygen-doped $AlN_x$ (i.e., they may have an $AlN_x$ crystal structure (e.g., wurtzite) and need not have an AlON crystal structure). Exemplary $AlO_xN_y$ high RI materials may comprise from about 0 atom % to about 20 atom % oxygen, or from about 5 atom % to about 15 atom % oxygen, while including 30 atom % to about 50 atom % nitrogen. Exemplary $Si_u$ $Al_vO_xN_y$ high RI materials may comprise from about 10 atom % to about 30 atom % or from about 15 atom % to about 25 atom % silicon, from about 20 atom % to about 40 atom % or from about 25 atom % to about 35 atom % aluminum, from about 0 atom % to about 20 atom % or from about 1 atom % to about 20 atom % oxygen, and from about 30 atom % to about 50 atom % nitrogen. The foregoing materials may be hydrogenated up to about 30% by weight. Where a material having a medium refractive index is desired, some embodiments may utilize AlN and/or $SiO_xN_y$. It should be understood that a scratch-resistant layer 150 may comprise any of the materials disclosed as suitable for use in a high RI layer.

In one or more embodiments, such as depicted in FIG. 4, the optical coating 120 may comprise a scratch-resistant layer 150 that is integrated as a high RI layer, and one or more low RI layers 130A and high RI layers 130B may be positioned over the scratch-resistant layer 150. The scratch-resistant layer may be alternately defined as the thickest high RI layer in the overall optical coating 120 or in the overall coated article 100. Without being bound by theory, it is believed that the coated article 100 may exhibit increased hardness at indentation depths when a relatively thin amount of material is deposited over the scratch-resistant layer 150. However, the inclusion of low RI and high RI layers over the scratch-resistant layer 150 may enhance the optical properties of the coated article 100. In some embodiments, relatively few layers (e.g., only 1, 2, 3, 4, or 5 layers) may positioned over the scratch-resistant layer 150 and these layers may each be relatively thin (e.g. less than 100 nm, less than 75 nm, less than 50 nm, or even less than 25 nm).

According to one or more embodiments, the scratch-resistant layer 150 may comprise one or more light-altering features. Incorporating light-altering features into the scratch-resistant layer 150 may serve to reduce oscillations in the reflectance and/or transmittance spectrum of the coated article 100 where a large percentage of the reflective interference of the coated article occurs at the interfaces 155 of the scratch-resistant layer. For example, as shown in FIG. 4, the interfaces 155 adjacent the scratch-resistant layer 150 may be rough, as described herein. One or both of interfaces 155 may be rough. In some embodiments, additional interfaces, such as those between layers 130A and 130B, and/or those between 130B and 140, or even the air-side surface 122 of the coated article 100 may be rough.

In one or more embodiments, other light-altering features may be present in the scratch-resistant layer 150. For example, light-scattering members 180, as described herein, may be deposited in the scratch-resistant layer 150 or at the interfaces 155. In additional embodiments, other layers of the optical coating 120 may comprise light-altering features, such as the high RI layers 130B or low RI layers 130A.

In one or more embodiments, the optical coating 120 may include one or more additional top coatings 140 disposed on the anti-reflective coating 130, as shown in FIG. 4. In one or more embodiments, the additional top coating 140 may include an easy-to-clean coating. An example of a suitable an easy-to-clean coating is described in U.S. patent application Ser. No. 13/690,904, entitled "PROCESS FOR MAKING OF GLASS ARTICLES WITH OPTICAL AND EASY-TO-CLEAN COATINGS," filed on Nov. 30, 2012, and published as U.S. Pub. No. 2014/0113083, which is incorporated herein in its entirety by reference. The easy-to-clean coating may have a thickness in the range from about 5 nm to about 50 nm and may include known materials such as fluorinated silanes. The easy-to-clean coating may alternately or additionally comprise a low-friction coating or surface treatment. Exemplary low-friction coating materials may include diamond-like carbon, silanes (e.g. fluorosilanes), phosphonates, alkenes, and alkynes. In some embodiments, the easy-to-clean coating may have a thickness in the range from about 1 nm to about 40 nm, from about 1 nm to about 30 nm, from about 1 nm to about 25 nm, from about 1 nm to about 20 nm, from about 1 nm to about 15 nm, from about 1 nm to about 10 nm, from about 5 nm to about 50 nm, from about 10 nm to about 50 nm, from about 15 nm to about 50 nm, from about 7 nm to about 20 nm, from about 7 nm to about 15 nm, from about 7 nm to about 12 nm or from about 7 nm to about 10 nm, and all ranges and sub-ranges therebetween.

The top coating 140 may include a scratch-resistant layer or layers which comprise any of the materials disclosed as being suitable for use in the scratch-resistant layer 150. In some embodiments, the additional coating 140 includes a combination of easy-to-clean material and scratch-resistant material. In one example, the combination includes an easy-to-clean material and diamond-like carbon. Such additional top coatings 140 may have a thickness in the range from about 5 nm to about 20 nm. The constituents of the additional coating 140 may be provided in separate layers. For example, the diamond-like carbon may be disposed as a first layer and the easy-to-clean can be disposed as a second layer on the first layer of diamond-like carbon. The thicknesses of the first layer and the second layer may be in the ranges provided above for the additional coating. For example, the first layer of diamond-like carbon may have a thickness of about 1 nm to about 20 nm or from about 4 nm to about 15 nm (or more specifically about 10 nm) and the second layer of easy-to-clean may have a thickness of about 1 nm to about 10 nm (or more specifically about 6 nm). The diamond-like coating may include tetrahedral amorphous carbon (Ta—C), Ta—C:H, and/or a-C—H.

In one or more embodiments, at least one of the layers (such as a low RI layer 130A or a high RI layer 130B) of the anti-reflective coating 130 may include a specific optical thickness (or optical thickness range). As used herein, the term "optical thickness" refers to the product of the physical thickness and the refractive index of a layer. In one or more embodiments, at least one of the layers of the anti-reflective coating 130 may have an optical thickness in the range from about 2 nm to about 200 nm, from about 10 nm to about 100 nm, from about 15 nm to about 100 nm, from about 15 to about 500 nm, or from about 15 to about 5000 nm. In some embodiments, all of the layers in the anti-reflective coating 130 may each have an optical thickness in the range from about 2 nm to about 200 nm, from about 10 nm to about 100 nm, from about 15 nm to about 100 nm, from about 15 to about 500 nm, or from about 15 to about 5000 nm. In some embodiments, at least one layer of the anti-reflective coating 130 has an optical thickness of about 50 nm or greater. In some embodiments, each of the low RI layers 103A have an optical thickness in the range from about 2 nm to about 200 nm, from about 10 nm to about 100 nm, from about 15 nm to about 100 nm, from about 15 to about 500 nm, or from about 15 to about 5000 nm. In some embodiments, each of the high RI layers 130B have an optical thickness in the range from about 2 nm to about 200 nm, from about 10 nm to about 100 nm, from about 15 nm to about 100 nm, from about 15 to about 500 nm, or from about 15 to about 5000 nm. In embodiments with a three layer period, each of the medium RI layers have an optical thickness in the range from about 2 nm to about 200 nm, from about 10 nm to about 100 nm, from about 15 nm to about 100 nm, from about 15 to about 500 nm, or from about 15 to about 5000 nm.

Figure 5:
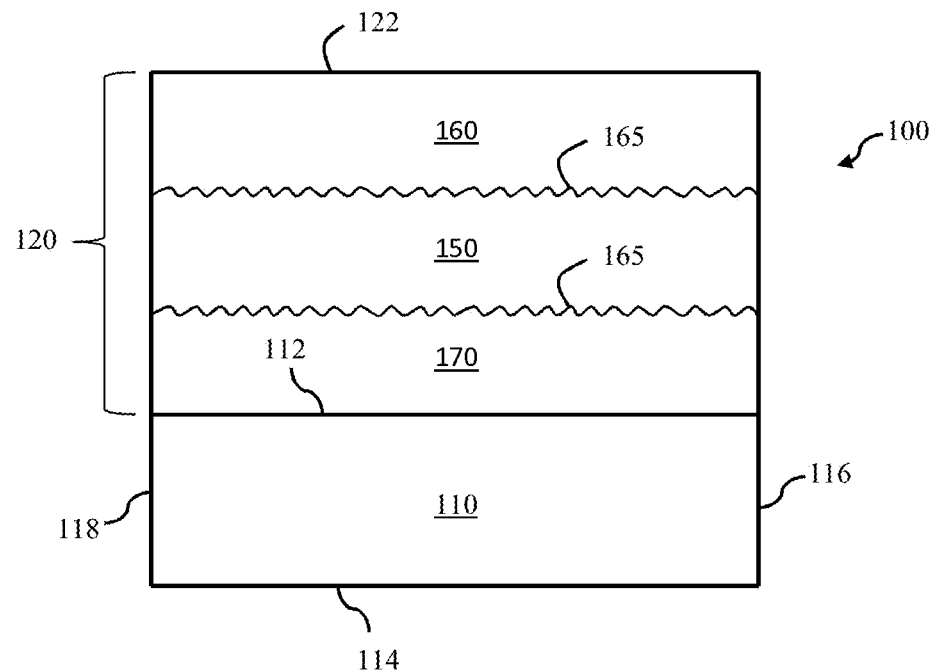
FIG. 5 is a cross-sectional side view of a coated article, according to one or more embodiments described herein.
Figure 6:
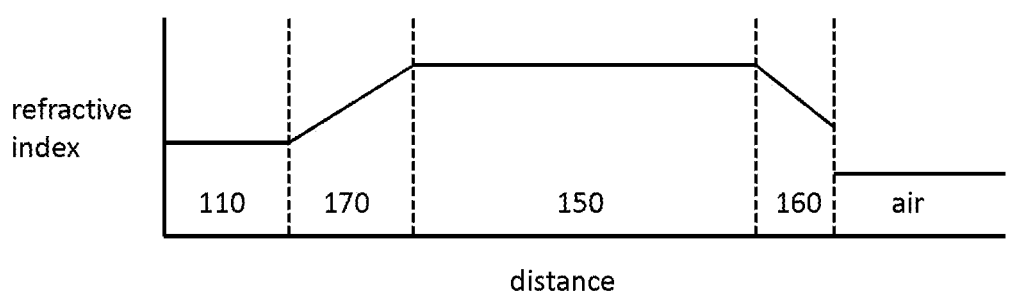
FIG. 6 is a plot of refractive index as a function of distance in the coated article of FIG. 5, according to one or more embodiments described herein.

In one or more embodiments, the optical coating may comprise one or more gradient layers, which each may comprise a compositional gradient along their respective thicknesses, as shown in FIG. 5. In one embodiment, the optical coating 120 may comprise a bottom gradient layer 170, a scratch-resistant layer 150 (as described above), and a top gradient layer 160. FIG. 6 depicts an example refractive index profile of an optical coating 120 of FIG. 5. The substrate 110, bottom gradient layer 170, scratch-resistant layer 150, and top gradient layer 160 are marked in their corresponding portions on the refractive index profile of FIG. 6. The bottom gradient layer 170 may be positioned in direct contact with the substrate 110. The scratch-resistant layer 150 may be over the bottom gradient layer 170, and the top gradient layer may be in direct contact and over the scratch-resistant layer 150. The scratch-resistant layer 150 may comprise one or more relatively hard materials with high refractive indices, such as $SiN_x$. In embodiments, the thickness of the scratch-resistant layer 150 may be from about 300 nm to several microns, such as is described with reference to the scratch-resistant layer 150 in other embodiments. The bottom gradient layer 170 may have a refractive index which varies from about the refractive index of the substrate (which may be relatively low) in portions which contact the substrate 110 to the refractive index of the scratch-resistant layer 150 (which may be relatively high) in portions that contact the scratch-resistant layer 150. The bottom gradient layer 170 may have a thickness of from about 10 nm to several microns, such as 50 nm to 1000 nm, 100 nm to 1000 nm, or 500 nm to 1000 nm. The top gradient layer 160 may have a refractive index which varies from about the refractive index of the scratch-resistant layer 150 (which may be relatively high) at portions which contact the scratch-resistant layer 150 to a relatively low refractive index at the air interface at the air-side surface 122. The uppermost portion of the top gradient layer 160 (at the air-side surface 122) may comprise materials with a refractive index of 1.35 to 1.55, such as, but not limited to, silicate glass, silica, phosphorous glass, or magnesium fluoride.

As described in other embodiments of coated articles 100, the scratch-resistant layer 150 may include light-altering features, such as rough interfaces 165 or light-scattering members (depicted in other embodiments).

In one or more embodiments, the refractive index of the bottom gradient layer 170 at the substrate may be within 0.2 (such as within 0.15, 0.1, 0.05, 0.02, or 0.01) of the refractive index of the substrate 110. The refractive index of the bottom gradient layer 170 at the scratch-resistant layer 150 may be within 0.2 (such as within 0.15, 0.1, 0.05, 0.02, or 0.01) of the refractive index of the scratch-resistant layer 150. The refractive index of the top gradient layer 160 at the scratch-resistant layer 150 may be within 0.2 (such as within 0.15, 0.1, 0.05, 0.02, or 0.01) of the refractive index of the scratch-resistant layer 150. The refractive index of the top gradient layer 160 at the air-side surface 122 may be from about 1.35 to about 1.55. In embodiments, the refractive index of the scratch-resistant layer may be at least about 1.75, 1.8, or even 1.9.

The substrate 110 may include an inorganic material and may include an amorphous substrate, a crystalline substrate or a combination thereof. The substrate 110 may be formed from man-made materials and/or naturally occurring materials (e.g., quartz and polymers). For example, in some instances, the substrate 110 may be characterized as organic and may specifically be polymeric. Examples of suitable polymers include, without limitation: thermoplastics including polystyrene (PS) (including styrene copolymers and blends), polycarbonate (PC) (including copolymers and blends), polyesters (including copolymers and blends, including polyethyleneterephthalate and polyethyleneterephthalate copolymers), polyolefins (PO) and cyclicpolyolefins (cyclic-PO), polyvinylchloride (PVC), acrylic polymers including polymethyl methacrylate (PMMA) (including copolymers and blends), thermoplastic urethanes (TPU), polyetherimide (PEI) and blends of these polymers with each other. Other exemplary polymers include epoxy, styrenic, phenolic, melamine, and silicone resins.

In some specific embodiments, the substrate 110 may specifically exclude polymeric, plastic and/or metal substrates. The substrate 110 may be characterized as alkali-including substrates (i.e., the substrate includes one or more alkalis). In one or more embodiments, the substrate exhibits a refractive index in the range from about 1.45 to about 1.55. In specific embodiments, the substrate 110 may exhibit an average strain-to-failure at a surface on one or more opposing major surface that is 0.5% or greater, 0.6% or greater, 0.7% or greater, 0.8% or greater, 0.9% or greater, 1% or greater, 1.1% or greater, 1.2% or greater, 1.3% or greater, 1.4% or greater 1.5% or greater or even 2% or greater, as measured using ball-on-ring testing using at least 5, at least 10, at least 15, or at least 20 samples. In specific embodiments, the substrate 110 may exhibit an average strain-to-failure at its surface on one or more opposing major surface of about 1.2%, about 1.4%, about 1.6%, about 1.8%, about 2.2%, about 2.4%, about 2.6%, about 2.8%, or about 3% or greater.

Suitable substrates 110 may exhibit an elastic modulus (or Young's modulus) in the range from about 30 GPa to about 120 GPa. In some instances, the elastic modulus of the substrate may be in the range from about 30 GPa to about 110 GPa, from about 30 GPa to about 100 GPa, from about 30 GPa to about 90 GPa, from about 30 GPa to about 80 GPa, from about 30 GPa to about 70 GPa, from about 40 GPa to about 120 GPa, from about 50 GPa to about 120 GPa, from about 60 GPa to about 120 GPa, from about 70 GPa to about 120 GPa, and all ranges and sub-ranges therebetween.

In one or more embodiments, an amorphous substrate may include glass, which may be strengthened or non-strengthened. Examples of suitable glass include soda lime glass, alkali aluminosilicate glass, alkali containing borosilicate glass and alkali aluminoborosilicate glass. In some variants, the glass may be free of lithia. In one or more alternative embodiments, the substrate 110 may include crystalline substrates such as glass ceramic substrates (which may be strengthened or non-strengthened) or may include a single crystal structure, such as sapphire. In one or more specific embodiments, the substrate 110 includes an amorphous base (e.g., glass) and a crystalline cladding (e.g., sapphire layer, a polycrystalline alumina layer and/or or a spinel ($MgAl_2O_4$) layer).

The substrate 110 of one or more embodiments may have a hardness that is less than the hardness of the article (as measured by the Berkovich Indenter Hardness Test described herein). The hardness of the substrate 110 may be measured using known methods in the art, including but not limited to the Berkovich Indenter Hardness Test or Vickers hardness test.

The substrate 110 may be substantially optically clear, transparent and free from light scattering. In such embodiments, the substrate 110 may exhibit an average light transmittance over the optical wavelength regime of about 85% or greater, about 86% or greater, about 87% or greater, about 88% or greater, about 89% or greater, about 90% or greater, about 91% or greater or about 92% or greater. In one or more alternative embodiments, the substrate 110 may be opaque or exhibit an average light transmittance over the optical wavelength regime of less than about 10%, less than about 9%, less than about 8%, less than about 7%, less than about 6%, less than about 5%, less than about 4%, less than about 3%, less than about 2%, less than about 1%, or less than about 0.5%. In some embodiments, these light reflectance and transmittance values may be a total reflectance or total transmittance (taking into account reflectance or transmittance on both major surfaces of the substrate) or may be observed on a single-side of the substrate (i.e., on the air-side surface 122 only, without taking into account the opposite surface). Unless otherwise specified, the average reflectance or transmittance of the substrate alone is measured at an incident illumination angle of 0 degrees relative to the substrate surface 112 (however, such measurements may be provided at incident illumination angles of 45 degrees or 60 degrees). The substrate 110 may optionally exhibit a color, such as white, black, red, blue, green, yellow, orange etc.

Additionally or alternatively, the physical thickness of the substrate 110 may vary along one or more of its dimensions for aesthetic and/or functional reasons. For example, the edges of the substrate 110 may be thicker as compared to more central regions of the substrate 110. The length, width and physical thickness dimensions of the substrate 110 may also vary according to the application or use of the article 100.

The substrate 110 may be provided using a variety of different processes. For instance, where the substrate 110 includes an amorphous substrate such as glass, various forming methods can include float glass processes and down-draw processes such as fusion draw and slot draw.

Once formed, a substrate 110 may be strengthened to form a strengthened substrate. As used herein, the term "strengthened substrate" may refer to a substrate that has been chemically strengthened, for example through ion-exchange of larger ions for smaller ions in the surface of the substrate. However, other strengthening methods known in the art, such as thermal tempering, or utilizing a mismatch of the coefficient of thermal expansion between portions of the substrate to create compressive stress and central tension regions, may be utilized to form strengthened substrates.

Where the substrate 110 is chemically strengthened by an ion exchange process, the ions in the surface layer of the substrate are replaced by—or exchanged with—larger ions having the same valence or oxidation state. Ion exchange processes are typically carried out by immersing a substrate in a molten salt bath containing the larger ions to be exchanged with the smaller ions in the substrate. It will be appreciated by those skilled in the art that parameters for the ion exchange process, including, but not limited to, bath composition and temperature, immersion time, the number of immersions of the substrate in a salt bath (or baths), use of multiple salt baths, additional steps such as annealing, washing, and the like, are generally determined by the composition of the substrate and the desired compressive stress (CS), depth of compressive stress layer (or depth of layer) of the substrate that result from the strengthening operation. By way of example, ion exchange of alkali metal-containing glass substrates may be achieved by immersion in at least one molten bath containing a salt such as, but not limited to, nitrates, sulfates, and chlorides of the larger alkali metal ion. The temperature of the molten salt bath typically is in a range from about 380° C. up to about 450° C., while immersion times range from about 15 minutes up to about 40 hours. However, temperatures and immersion times different from those described above may also be used.

In addition, non-limiting examples of ion exchange processes in which glass substrates are immersed in multiple ion exchange baths, with washing and/or annealing steps between immersions, are described in U.S. Pat. No. 8,561,429, in which glass substrates are strengthened by immersion in multiple, successive, ion exchange treatments in salt baths of different concentrations; and U.S. Pat. No. 8,312,739, by Christopher M. Lee et al., issued on Nov. 20, 2012, and entitled "Dual Stage Ion Exchange for Chemical Strengthening of Glass," and claiming priority from U.S. Provisional Patent Application No. 61/084,398, filed Jul. 29, 2008, in which glass substrates are strengthened by ion exchange in a first bath is diluted with an effluent ion, followed by immersion in a second bath having a smaller concentration of the effluent ion than the first bath. The contents of U.S. Pat. Nos. 8,561,429 and 8,312,739 are incorporated herein by reference in their entirety.

The degree of chemical strengthening achieved by ion exchange may be quantified based on the parameters of central tension (CT), surface CS, and depth of layer (DOL). Surface CS may be measured near the surface or within the strengthened glass at various depths. A maximum CS value may include the measured CS at the surface ($CS_s$) of the strengthened substrate. The CT, which is computed for the inner region adjacent the compressive stress layer within a glass substrate, can be calculated from the CS, the physical thickness t, and the DOL. CS and DOL are measured using those means known in the art. Such means include, but are not limited to, measurement of surface stress (FSM) using commercially available instruments such as the FSM-6000, manufactured by Luceo Co., Ltd. (Tokyo, Japan), or the like, and methods of measuring CS and DOL are described in ASTM 1422C-99, entitled "Standard Specification for Chemically Strengthened Flat Glass," and ASTM 1279.19779 "Standard Test Method for Non-Destructive Photoelastic Measurement of Edge and Surface Stresses in Annealed, Heat-Strengthened, and Fully-Tempered Flat Glass," the contents of which are incorporated herein by reference in their entirety. Surface stress measurements rely upon the accurate measurement of the stress optical coefficient (SOC), which is related to the birefringence of the glass substrate. SOC in turn is measured by those methods that are known in the art, such as fiber and four point bend methods, both of which are described in ASTM standard C770-98 (2008), entitled "Standard Test Method for Measurement of Glass Stress-Optical Coefficient," the contents of which are incorporated herein by reference in their entirety, and a bulk cylinder method. The relationship between CS and CT is given by the expression:

$$CT=(CS \cdot DOL)/(a-2DOL)$$

wherein a is the physical thickness (μm) of the glass article. In various sections of the disclosure, CT and CS are expressed herein in megaPascals (MPa), physical thickness a is expressed in either micrometers (μm) or millimeters (mm) and DOL is expressed in micrometers (μm).

In one embodiment, a strengthened substrate 110 can have a surface CS of 250 MPa or greater, 300 MPa or greater, e.g., 400 MPa or greater, 450 MPa or greater, 500 MPa or greater, 550 MPa or greater, 600 MPa or greater, 650 MPa or greater, 700 MPa or greater, 750 MPa or greater or 800 MPa or greater. The strengthened substrate may have a DOL of 10 μm or greater, 15 μm or greater, 20 μm or greater (e.g., 25 μm, 30 μm, 35 μm, 40 μm, 45 μm, 50 μm or greater) and/or a CT of 10 MPa or greater, 20 MPa or greater, 30 MPa or greater, 40 MPa or greater (e.g., 42 MPa, 45 MPa, or 50 MPa or greater) but less than 100 MPa (e.g., 95, 90, 85, 80, 75, 70, 65, 60, 55 MPa or less). In one or more specific embodiments, the strengthened substrate has one or more of the following: a surface CS greater than 500 MPa, a DOL greater than 15 μm, and a CT greater than 18 MPa.

Example glasses that may be used in the substrate 110 may include alkali aluminosilicate glass compositions or alkali aluminoborosilicate glass compositions, though other glass compositions are contemplated. Such glass compositions are capable of being chemically strengthened by an ion exchange process. One example glass composition comprises $SiO_2$, $B_2O_3$ and $Na_2O$, where $(SiO_2+B_2O_3) \geq 66$ mol. %, and $Na_2O \geq 9$ mol. %. In an embodiment, the glass composition includes at least 6 wt. % aluminum oxide. In a further embodiment, the substrate 110 includes a glass composition with one or more alkaline earth oxides, such that a content of alkaline earth oxides is at least 5 wt. %. Suitable glass compositions, in some embodiments, further comprise at least one of $K_2O$, MgO, and CaO. In a particular embodiment, the glass compositions used in the substrate can comprise 61-75 mol. % SiO2; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example glass composition suitable for the substrate comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % $\leq (Li_2O+Na_2O+K_2O) \leq 20$ mol. % and 0 mol. % $\leq (MgO+CaO) \leq 10$ mol. %.

A still further example glass composition suitable for the substrate comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. % $\leq (Li_2O+Na_2O+K_2O) \leq 18$ mol. % and 2 mol. % $\leq (MgO+CaO) \leq 7$ mol. %.

In a particular embodiment, an alkali aluminosilicate glass composition suitable for the substrate 110 comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio $(Al_2O_3+B_2O_3)/\Sigma modifiers$ (i.e., sum of modifiers) is greater than 1, where in the ratio the components are expressed in mol. % and the modifiers are alkali metal oxides. This glass composition, in particular embodiments, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $(Al_2O_3+B_2O_3)/\Sigma modifiers$ (i.e., sum of modifiers) is greater than 1.

In still another embodiment, the substrate may include an alkali aluminosilicate glass composition comprising: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. % $\leq SiO_2+B_2O_3+CaO \leq 69$ mol. %; $Na_2O+K_2O+B_2O_3+MgO+CaO+SrO>10$ mol. %; 5 mol. % $\leq MgO+CaO+SrO \leq 8$ mol. %; $(Na_2O+B_2O_3)-Al_2O_3 \leq 2$ mol. %; 2 mol. % $\leq Na_2O-Al_2O_3 \leq 6$ mol. %; and 4 mol. % $\leq (Na_2O+K_2O)-Al_2O_3 \leq 10$ mol. %.

In an alternative embodiment, the substrate 110 may comprise an alkali aluminosilicate glass composition comprising: 2 mol % or more of $Al_2O_3$ and/or $ZrO_2$, or 4 mol % or more of $Al_2O_3$ and/or $ZrO_2$.

Where the substrate 110 includes a crystalline substrate, the substrate may include a single crystal, which may include $Al_2O_3$. Such single crystal substrates are referred to as sapphire. Other suitable materials for a crystalline substrate include polycrystalline alumina layer and/or spinel ($MgAl_2O_4$).

Optionally, the crystalline substrate 110 may include a glass ceramic substrate, which may be strengthened or non-strengthened. Examples of suitable glass ceramics may include $Li_2O-Al_2O_3-SiO_2$ system (i.e. LAS-System) glass ceramics, $MgO-Al_2O_3-SiO_2$ system (i.e. MAS-System) glass ceramics, and/or glass ceramics that include a predominant crystal phase including β-quartz solid solution, β-spodumene ss, cordierite, and lithium disilicate. The glass ceramic substrates may be strengthened using the chemical strengthening processes disclosed herein. In one or more embodiments, MAS-System glass ceramic substrates may be strengthened in $Li_2SO_4$ molten salt, whereby an exchange of $2Li^+$ for $Mg^{2+}$ can occur.

The substrate 110 according to one or more embodiments can have a physical thickness ranging from about 100 μm to about 5 mm in various portions of the substrate 110. Example substrate 110 physical thicknesses range from about 100 μm to about 500 μm (e.g., 100, 200, 300, 400 or 500 μm). Further example substrate 110 physical thicknesses range from about 500 μm to about 1000 μm (e.g., 500, 600, 700, 800, 900 or 1000 μm). The substrate 110 may have a physical thickness greater than about 1 mm (e.g., about 2, 3, 4, or 5 mm). In one or more specific embodiments, the substrate 110 may have a physical thickness of 2 mm or less, or less than 1 mm. The substrate 110 may be acid polished or otherwise treated to remove or reduce the effect of surface flaws.

The optical coating 120 and/or the article 100 may be described in terms of a hardness measured by a Berkovich Indenter Hardness Test. As used herein, the "Berkovich Indenter Hardness Test" includes measuring the hardness of a material on a surface thereof by indenting the surface with a diamond Berkovich indenter. The Berkovich Indenter Hardness Test includes indenting the air-side surface 122 of the coated article 100 (or the surface of any one or more of the layers in the anti-reflective coating) with the diamond Berkovich indenter to form an indent to an indentation depth in the range from about 50 nm to about 1000 nm (or the entire thickness of the optical coating 120, whichever is less) and measuring the maximum hardness from this indentation along the entire indentation depth range or a segment of this indentation depth (e.g., in the range from about 100 nm to about 600 nm), generally using the methods set forth in Oliver, W. C.; Pharr, G. M. An improved technique for determining hardness and elastic modulus using load and displacement sensing indentation experiments. *J. Mater. Res.*, Vol. 7, No. 6, 1992, 1564-1583; and Oliver, W. C.; Pharr, G. M. Measurement of Hardness and Elastic Modulus by Instrument Indentation: Advances in Understanding and Refinements to Methodology. *J. Mater. Res.*, Vol. 19, No. 1, 2004, 3-20. As used herein, hardness refers to a maximum hardness as measured along a range of indentation depths, and not an average hardness.

Typically, in nanoindentation measurement methods (such as by using a Berkovich indenter) where the coating is harder than the underlying substrate, the measured hardness may appear to increase initially due to development of the plastic zone at shallow indentation depths (e.g., less than 25 nm or less than 50 nm) and then increases and reaches a maximum value or plateau at deeper indentation depths (e.g., from 50 nm to about 500 nm or 1000 nm). Thereafter, hardness begins to decrease at even deeper indentation depths due to the effect of the underlying substrate. Where a substrate having a greater hardness compared to the coating is utilized, the same effect can be seen; however, the hardness increases at deeper indentation depths due to the effect of the underlying substrate.

The indentation depth range and the hardness values at certain indentation depth ranges can be selected to identify a particular hardness response of the optical coatings 120 and layers thereof, described herein, without the effect of the underlying substrate 110. When measuring hardness of the optical coating 120 (when disposed on a substrate 110) with a Berkovich indenter, the region of permanent deformation (plastic zone) of a material is associated with the hardness of the material. During indentation, an elastic stress field extends well beyond this region of permanent deformation. As indentation depth increases, the apparent hardness and modulus are influenced by stress field interactions with the underlying substrate 110. The influence of the substrate on hardness occurs at deeper indentation depths (i.e., typically at depths greater than about 10% of the optical coating 120). Moreover, a further complication is that the hardness response requires a certain minimum load to develop full plasticity during the indentation process. Prior to that certain minimum load, the hardness shows a generally increasing trend.

At small indentation depths (which also may be characterized as small loads) (e.g., up to about 50 nm), the apparent hardness of a material appears to increase dramatically versus indentation depth. This small indentation depth regime does not represent a true metric of hardness but, instead, reflects the development of the aforementioned plastic zone, which is related to the finite radius of curvature of the indenter. At intermediate indentation depths, the apparent hardness approaches maximum levels. At deeper indentation depths, the influence of the substrate becomes more pronounced as the indentation depths increase. Hardness may begin to drop dramatically once the indentation depth exceeds about 30% of the optical coating thickness.

In one or more embodiments, the coated article 100 may exhibit a hardness of about 5 GPa or greater, about 8 GPa or greater, about 10 GPa or greater or about 12 GPa or greater (e.g., 14 GPa or greater, 16 GPa or greater, 18 GPa or greater, or even 20 GPa or greater), as measured on the air-side surface 122, by a Berkovitch Indenter Hardness Test. In one or more embodiments, the optical coating 120 may exhibit a maximum hardness of about 8 GPa or greater, about 10 GPa or greater, or about 12 GPa or greater (e.g., 14 GPa or greater, 16 GPa or greater, 18 GPa or greater, or even 20 GPa or greater) as measured on the air-side surface 122 by a Berkovich Indenter Hardness Test. Additionally, the hardness of the material of a high RI layer 130B and/or scratch-resistant layer 150 may be characterized specifically. In some embodiments, the maximum hardness of the high RI layer and/or the scratch-resistant layer 150, as measured by the Berkovitch Indenter Hardness Test, may be about 8 GPa or greater, about 10 GPa or greater, about 12 GPa or greater, about 15 GPa or greater, about 18 GPa or greater, or even about 20 GPa or greater. A layer's hardness may be measured by analyzing a coated article where the layer measured is the uppermost layer. If the layer to be measured for hardness is a buried layer, its hardness may be measured by producing a coated article which does not include the overlying layers and subsequently testing the coated article for hardness. Such measured hardness values may be exhibited by the coated article 100, optical coating 120, high RI layer 130B, and/or scratch-resistant layer 150 along an indentation depth of about 50 nm or greater or about 100 nm or greater (e.g., from about 100 nm to about 300 nm, from about 100 nm to about 400 nm, from about 100 nm to about 500 nm, from about 100 nm to about 600 nm, from about 200 nm to about 300 nm, from about 200 nm to about 400 nm, from about 200 nm to about 500 nm, or from about 200 nm to about 600 nm). In one or more embodiments, the article exhibits a hardness that is greater than the hardness of the substrate (which can be measured on the opposite surface from the air-side surface 122).

Optical interference between reflected waves from the optical coating 120/air interface and the optical coating 120/substrate 110 interface can lead to spectral reflectance and/or transmittance oscillations that create apparent color in the article 100. As used herein, the term "transmittance" is defined as the percentage of incident optical power within a given wavelength range transmitted through a material (e.g., the article, the substrate or the optical film or portions thereof). The term "reflectance" is similarly defined as the percentage of incident optical power within a given wavelength range that is reflected from a material (e.g., the article, the substrate, or the optical film or portions thereof). Transmittance and reflectance are measured using a specific linewidth. As used herein, an "average transmittance" refers to the average amount of incident optical power transmitted through a material over a defined wavelength regime. As used herein, an "average reflectance" refers to the average amount of incident optical power reflected by the material. Reflectance may be measured as a single-side reflectance when measured at the air-side surface 122 only (e.g., when removing the reflections from an uncoated back surface (e.g., 114 in FIG. 3) of the coated article 100, such as through using index-matching oils on the back surface coupled to an absorber, or other known methods). In one or more embodiments, the spectral resolution of the characterization of the transmittance and reflectance is less than 5 nm or 0.02 eV. The color may be more pronounced in reflection. The angular color may shift in reflection with viewing angle due to a shift in the spectral reflectance oscillations with incident illumination angle. Angular color shifts in transmittance with viewing angle are also due to the same shift in the spectral transmittance oscillation with incident illumination angle. The observed color and angular color shifts with incident illumination angle are often distracting or objectionable to device users, particularly under illumination with sharp spectral features such as fluorescent lighting and some LED lighting. Angular color shifts in transmittance may also play a factor in color shift in reflection and vice versa. Factors in angular color shifts in transmittance and/or reflectance may also include angular color shifts due to viewing angle or angular color shifts away from a certain white point that may be caused by material absorption (somewhat independent of angle) defined by a particular illuminant or test system.

The articles described herein exhibit an average light transmittance and a single-side average light reflectance over a specified wavelength ranges in or near the visible spectrum. Additionally, the articles described herein exhibit an average visible photopic reflectance and an average visible photopic reflectance over a specified wavelength ranges in or near the visible spectrum. In embodiments, the wavelength ranges (sometimes referred to herein as a "wavelength regime") for measuring average light transmittance, single-side average light reflectance, average visible photopic reflectance, and average visible photopic reflectance may be from about 450 nm to about 650 nm, from about 420 nm to about 680 nm, from about 420 nm to about 700 nm, from about 420 nm to about 740 nm, from about 420 nm to about 850 nm, or from about 420 nm to about 950 nm. Unless otherwise specified, the average light transmittance, single-side average light reflectance, average visible photopic reflectance, and average visible photopic reflectance are measured at an incident illumination angle near normal to the air-side surface 122, such as at an angle of incidence of from about 0 degrees to about 10 degrees (however, such measurements may be collected at other incident illumination angles, such as, e.g., 30 degrees, 45 degrees, or 60 degrees).

In one or more embodiments, a coated article 100 may exhibit an average single-side light reflectance of about 50% or less, 40% or less, 30% or less, 20% or less, 10% or less, 9% or less, about 8% or less, about 7% or less, about 6% or less, about 5% or less, about 4% or less, about 3% or less, or even about 2% or less over the optical wavelength regime, when measured at the air-side surface 122 only (e.g., when removing the reflections from an uncoated back surface of the article, such as through using index-matching oils on the back surface coupled to an absorber, or other known methods). In embodiments, the average single-side light reflectance may be in the range from about 0.4% to about 9%, from about 0.4% to about 8%, from about 0.4% to about 7%, from about 0.4% to about 6%, or from about 0.4% to about 5%. In one or more embodiments, the coated article 100 exhibits an average light transmittance of about 50% or greater, 60% or greater, 70% or greater, 80% or greater, 90% or greater, 92% or greater, 94% or greater, 96% or greater, 98% or greater, or 99% or greater, over an optical wavelength regime. In embodiments, the coated article 100 may exhibit a light transmittance in the range from about 99.5 to about 90%, 92%, 94%, 96%, 98%, or 99%.

In some embodiments, the coated article 100 may exhibit an average visible photopic reflectance of about 50% or less, 40% or less, 30% or less, 20% or less, 10% or less, about 9% or less, about 8% or less, about 7% or less, about 6% or less, about 5% or less, about 4% or less, about 3% or less, about 2% or less, about 1% or less, or even about 0.8% or less over an optical wavelength regime. As used herein, photopic reflectance mimics the response of the human eye by weighting the reflectance versus wavelength spectrum according to the human eye's sensitivity. Photopic reflectance may also be defined as the luminance, or tristimulus Y value of reflected light, according to known conventions such as CIE color space conventions. The average photopic reflectance is defined in the below equation as the spectral reflectance, $R(\lambda)$ multiplied by the illuminant spectrum, $I(\lambda)$ and the CIE's color matching function $\bar{y}(\Delta)$, related to the eye's spectral response:

$$\langle R_p \rangle = \int_{380\ nm}^{720\ nm} R(\lambda) \times I(\lambda) \times \bar{y}(\lambda) d\lambda$$

In some embodiments, the article 100 may exhibit an average visible photopic transmittance of about 50% or greater, 60% or greater, 70% or greater, 80% or greater, about 85% or greater, about 90% or greater, about 92% or greater, about 94% or greater, about 96% or greater, or even about 98% or greater, over an optical wavelength regime. The average photopic transmittance is defined in the below equation as the spectral transmittance, $T(\lambda)$ multiplied by the illuminant spectrum, $I(\lambda)$ and the CIE's color matching function $\bar{y}(\lambda)$, related to the eye's spectral response:

$$\langle T_p \rangle = \int_{380\ nm}^{720\ nm} T(\lambda) \times I(\lambda) \times \bar{y}(\lambda) d\lambda$$

In one or more embodiments, the coated article 100 exhibits a measurable color (or lack thereof) in reflectance and transmittance in the CIE L*a*b* colorimetry system (referred to herein as a "color coordinate"). The transmittance color coordinates refer to the observed L*a*b* color coordinates in transmittance and the reflectance color coordinates refer to the observed L*a*b* color coordinates in reflectance. The transmittance color coordinates or reflectance color coordinates may be measured under a variety of illuminant light types, which may include standard illuminants as determined by the CIE, including A illuminants (representing tungsten-filament lighting), B illuminants (daylight simulating illuminants), C illuminants (daylight simulating illuminants), D series illuminants (representing natural daylight), and F series illuminants (representing various types of fluorescent lighting)). Specific illuminants include F2, F10, F11, F12 or D65, as defined by CIE. Additionally, the reflectance color coordinates and transmittance color coordinates may be measured at different observed angles of incidence, such as normal (0 degrees), 5 degrees, 10 degrees, 15 degrees, 30 degrees, 45 degrees, or 60 degrees.

In one or more embodiments, the coated article 100 has a* of less than or equal to about 10, 8, 6, 5, 4, 3, 2, or even 1 in transmittance and/or reflectance when viewed at a normal angle of incidence, or an angle of incidence of 5 degrees, 10 degrees, 15 degrees, 30 degrees, 45 degrees, or 60 degrees. In one or more embodiments, the coated article 100 has b* of less than or equal to about 10, 8, 6, 5, 4, 3, 2, or even 1 in transmittance and/or reflectance when viewed at a normal angle of incidence, or an angle of incidence of 5 degrees, 10 degrees, 15 degrees, 30 degrees, 45 degrees, or 60 degrees. In one or more embodiments, the coated article 100 has a* of greater than or equal to about −10, −8, −6, −5, −4, −3, −2, or even −1 in transmittance and/or reflectance when viewed at a normal angle of incidence, or an angle of incidence of 5 degrees, 10 degrees, 15 degrees, 30 degrees, 45 degrees, or 60 degrees. In one or more embodiments, the coated article 100 has b* of greater than or equal to about −10, −8, −6, −5, −4, −3, −2, or even −1 in transmittance and/or reflectance when viewed at a normal angle of incidence, or an angle of incidence of 5 degrees, 10 degrees, 15 degrees, 30 degrees, 45 degrees, or 60 degrees.

In one or more embodiments, a reference point color shift may be measured between a reference point and the transmittance color coordinates or reflectance color coordinates. The reference point color shift measures the difference in color between a reference point color coordinate and an observed color coordinate (either reflected or transmitted). The reflectance reference point color shift (sometimes referred to as the reference point color shift in reflectance) refers to the difference between the reflected color coordinate and the reference point. The transmittance reference point color shift (sometimes referred to as the reference point color shift in transmittance) refers to the difference between the transmitted color coordinates and the reference point. To determine the reference point color shift, a reference point is chosen. According to embodiments described herein, the reference point may be the origin in the CIE L*a*b* colorimetry system (the color coordinates a*=0, b*=0), the coordinates (a*=−2, b*=−2), or the transmittance or reflectance color coordinates of the substrate. It should be understood that unless otherwise noted, the L* coordinate of the articles described herein are the same as the reference point and do not influence color shift. Where the reference point color shift of the article is defined with respect to the substrate, the transmittance color coordinates of the article are compared to the transmittance color coordinates of the substrate and the reflectance color coordinates of the article are compared to the reflectance color coordinates of the substrate. Unless otherwise noted, the reference point color shift refers to the shift measured between the reference point and the color coordinate in transmittance or reflectance as measured at a normal angle relative to the air-side surface 122 of the coated article 100. However, it should be understood that the reference point color shift may be determined based on non-normal angles of incidence, such as 5 degrees, 10 degrees, 15 degrees, 30 degrees, 45 degrees, or 60 degrees. Additionally, unless otherwise noted, the reflectance color coordinates are measured on only the air-side surface 122 of the article. However, the reflectance color coordinates described herein can be measured on both the air-side surface 122 of the article and the opposite side of the article (i.e., major surface 114 in FIG. 1) using either a 2-surface measurement (reflections from two sides of an article are both included) or a 1-surface measurement (reflection only from the air-side surface 122 of the article is measured). Of these, the 1-surface reflectance measurement is typically the more challenging metric to achieve low reference point color shift values for anti-reflective coatings, and this has relevance to applications (such as smartphones, etc.) where the back surface of the article is bonded to a light absorbing medium such as black ink or an LCD or OLED device).

Where the reference point is the color coordinates a*=0, b*=0 (the origin), the reference point color shift is calculated by the following equation: reference point color shift=$\sqrt{((a^*_{article})^2+(b^*_{article})^2)}$.

Where the reference point is the color coordinates a*=−2, b*=−2, the reference point color shift is calculated by the following equation: reference point color shift=$\sqrt{((a^*_{article}+2)^2+(b^*_{article}+2)^2)}$.

Where the reference point is the color coordinates of the substrate, the reference point color shift is calculated by the following equation: reference point color shift=$\sqrt{((a^*_{article}-a^*_{substrate})^2+(b^*_{article}-b^*_{substrate})^2)}$.

In one or more embodiments, the reference point color shift in reflectance and/or transmittance is less than about 10, less than about 9, less than about 8, less than about 7, less than about 6, less than about 5, less than about 4, less than about 3, less than about 2.5, less than about 2, less than about 1.8, less than about 1.6, less than about 1.4, less than about 1.2, less than about 1, less than about 0.8, less than about 0.6, less than about 0.4, or even less than about 0.25, as measured relative to one of the disclosed reference points.

One aspect of this disclosure pertains to a coated article 100 that exhibits colorlessness in reflectance and/or transmittance even when viewed at a non-normal angle of incidence under an illuminant. In one or more embodiments, the coated articles 100 described herein may have a minimal change in visible color in reflectance and/or transmittance when the viewing angle is changed, or the same color may be perceived with angular shift. Such can be characterized by the angular color shift of a coated article 100 in reflectance or transmittance. Angular color shift may be determined using the following equation, where: angular color shift=$\sqrt{((a^*_2-a^*_1)^2+(b^*_2-b^*_1)^2)}$. In the angular color shift equation, $a^*_1$, and $b^*_1$ represent the a* and b* coordinates of the article when viewed at a reference illumination angle (which may include normal incidence) and $a^*_2$, and $b^*_2$ represent the a* and b* coordinates of the article when viewed at an incident illumination angle, provided that the incident illumination angle is different from the reference illumination angle and in some cases differs from the reference illumination angle by at least about 1 degree, 2 degrees or about 5 degrees. It should be understood that unless otherwise noted, the L* coordinate of the articles described herein are the same at any angle or reference point and do not influence color shift.

The reference illumination angle may include normal incidence (i.e., 0 degrees), or, for example, 5 degrees, 10 degrees, 15 degrees, 30 degrees, 45 degrees, or 60 degrees from normal incidence. However, unless stated otherwise, the reference illumination angle is a normal angle of incidence. The incident illumination angle may be, for example, about 5 degrees, 10 degrees, 15 degrees, 30 degrees, 45 degrees, or 60 degrees from the reference illumination angle. In one or more embodiments, the reference illumination angle may be in a range from 0 to 10 degrees and the incident illumination angle may be in a range from 30 to 60 degrees.

In one or more embodiments, the coated article 100 has an angular color shift in reflectance and/or transmittance from a incident illumination angle of from 0-10 degrees (e.g., 5 or less, 4 or less, 3 or less, or 2 or less) to an incident illumination angle in the range of 30-60 degrees under an illuminant. In some embodiments, the angular color shift in reflectance and/or transmittance is about 10 or less, 9 or less, 8 or less, 7 or less, 6 or less, 5 or less, 4 or less, 3 or less, 2 or less, 1.9 or less, 1.8 or less, 1.7 or less, 1.6 or less, 1.5 or less, 1.4 or less, 1.3 or less, 1.2 or less, 1.1 or less, 1 or less, 0.9 or less, 0.8 or less, 0.7 or less, 0.6 or less, 0.5 or less, 0.4 or less, 0.3 or less, 0.2 or less, or 0.1 or less. In some embodiments, the angular color shift may be about 0. The illuminant can include standard illuminants as determined by the CIE, including A illuminants (representing tungsten-filament lighting), B illuminants (daylight simulating illuminants), C illuminants (daylight simulating illuminants), D series illuminants (representing natural daylight), and F series illuminants (representing various types of fluorescent lighting). In specific examples, the articles exhibit an angular color shift in reflectance and/or transmittance of about 2 or less when viewed at incident illumination angle from the reference illumination angle under a CIE F2, F10, F11, F12 or D65 illuminant, or more specifically, under a CIE F2 illuminant.

In one or more embodiments, the coated article 100 has an angular color shift in reflectance and/or transmittance of about 10 or less (e.g., 5 or less, 4 or less, 3 or less, or 2 or less) at all incident illumination angles in a given range relative to the reference illumination angle. For example, the coated article 100 may have a angular color shift of about 10 or less, 5 or less, 4 or less, 3 or less, or 2 or less at all incident illumination angles in a range from the reference illumination angle to about 5 degrees, 10 degrees, 15 degrees, 30 degrees, 45 degrees, or 60 degrees from the reference illumination angle. In additional embodiments, the coated article 100 may have a angular color shift of about 1.9 or less, 1.8 or less, 1.7 or less, 1.6 or less, 1.5 or less, 1.4 or less, 1.3 or less, 1.2 or less, 1.1 or less, 1 or less, 0.9 or less, 0.8 or less, 0.7 or less, 0.6 or less, 0.5 or less, 0.4 or less, 0.3 or less, 0.2 or less, or 0.1 or less at all incident illumination angles in a range from the reference illumination angle to about 5 degrees, 10 degrees, 15 degrees, 30 degrees, 45 degrees, or 60 degrees from the reference illumination angle.

In one or more embodiments, the coated article 100 exhibits a haze value of about 10% of less, as measured on the abraded side using a hazemeter supplied by BYK Gardner under the trademark Haze-Gard Plus®, using an aperture over the source port, the aperture having a diameter of 8 mm. In some embodiments, the haze may be about 70% or less, 50% or less, about 25% or less, about 20% or less, about 15% or less, about 10% or less, about 9% or less, about 8% or less, about 7% or less, about 6% or less, about 5% or less, about 4% or less, about 3% or less, about 2% or less, about 1% or less, about 0.5% or less or about 0.3% or less. In some specific embodiments, the article 100 exhibits a haze in the range from about 0.1% to about 10%, from about 0.1% to about 9%, from about 0.1% to about 8%, from about 0.1% to about 7%, from about 0.1% to about 6%, from about 0.1% to about 5%, from about 0.1% to about 4%, from about 0.1% to about 3%, from about 0.1% to about 2%, from about 0.1% to about 1%, 0.3% to about 10%, from about 0.5% to about 10%, from about 1% to about 10%, from about 2% to about 10%, from about 3% to about 10%, from about 4% to about 10%, from about 5% to about 10%, from about 6% to about 10%, from about 7% to about 10%, from about 1% to about 8%, from about 2% to about 6%, from about 3% to about 5%, and all ranges and sub-ranges therebetween.

EXAMPLES

To produce a coated article, $BaF_2$ was deposited as a roughness-inducing light scattering layer on an ion-exchanged glass substrate (commercially available as GORILLA GLASS from Corning Inc.) Specifically, $BaF_2$ film growth through e-beam evaporation deposition at elevated temperature to creates a crown-type crystallite morphology leading to roughness. $BaF_2$ films were deposited at 3 Angstroms/second in a Temescal BJD-1800 e-beam evaporation unit with quartz lamps heating the substrate to about 200° C. Base pressure before deposition was $1.2\times10^{-6}$ torr. The roughness of the $BaF_2$ film increased as the film thickness increased due to the kinetics of crystallite nucleation and growth. Roughness was measured using a Veeco Dimension atomic force microscope. FIGS. 7A-7D depict micrograph images of deposited $BaF_2$ films on the glass substrate. Table 1 shows the $BaF_2$ thicknesses and roughness measurements for each coated sample, and additionally supplies a legend for FIGS. 7A-7D. Roughness was measured as $R_a$ (arithmetic average of absolute values roughness) and $R_q$ (root mean squared roughness). As a comparison, the glass substrate had a roughness ($R_a$ or $R_q$) of less that 1 nm.

TABLE 1

Figure 7A:
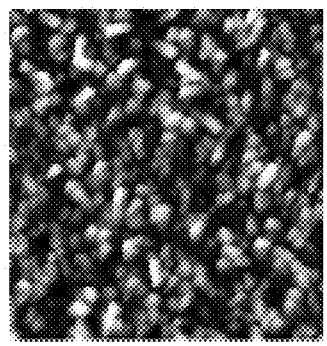
FIGS. 7A-7D depict atomic force micrographs of example $BaF_2$ coatings on a glass substrate, according to one or more embodiments described herein.
Figure 7B:
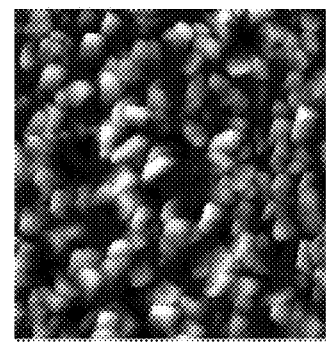
Figure 7C:
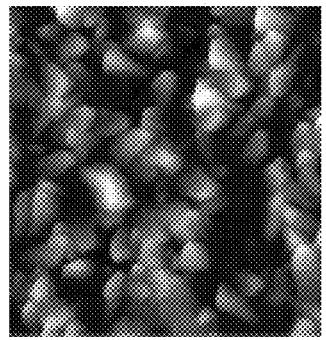
Figure 7D:
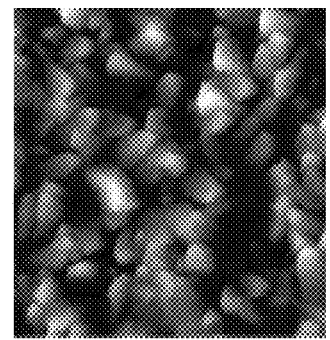

| FIG. | $BaF_2$ thickness (nm) | $R_a$ (nm) | $R_q$ (nm) |
|---|---|---|---|
| FIG. 7A | 300 | 7.88 | 9.65 |
| FIG. 7B | 600 | 15.1 | 18.6 |
| FIG. 7C | 1200 | 25.6 | 31.6 |
| FIG. 7D | 2400 | 33.4 | 41.9 |

Additionally, 2 micron layers of $SiN_x$ were deposited on top of $BaF_2$ layers described previously by PECVD using a Plasma-Therm HDPCVD at 150° C. The deposition utilized an inductively coupled plasma source to attain high ionization independent of substrate bias, which is set by a RF supply driving the platen on which the substrate sits. PECVD is a fairly conformal coating process, with relatively little roughness as deposited. The roughness of the $BaF_2$ layers was largely preserved after deposition of 2 microns of $SiN_x$ on top of the $BaF_2$ layers. FIGS. 8A-8D depict micrograph images of deposited $SiN_x$ films deposited over $BaF_2$ films on the glass substrate. Table 1 shows the $SiN_x$ layer and $BaF_2$ layer thicknesses and roughness measurements of the $SiN_x$ layer for each coated sample, and additionally supplies a legend for FIGS. 8A-8D.

TABLE 2

Figure 8A:
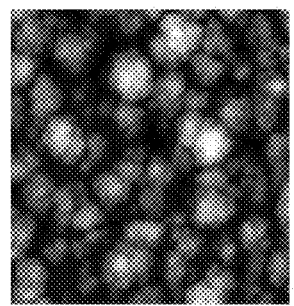
FIGS. 8A-8D depict atomic force micrographs of example $SiN_x$ coatings deposited over $BaF_2$ coatings on a glass substrate, according to one or more embodiments described herein.
Figure 8B:
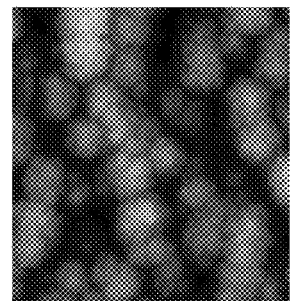
Figure 8C:
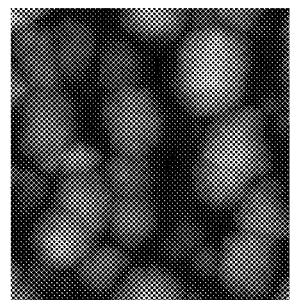
Figure 8D:
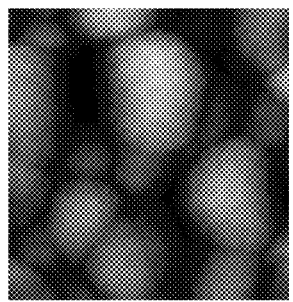

| FIG. | $BaF_2$ thickness (nm) | $SiN_x$ thickness (nm) | $R_a$ (nm) | $R_q$ (nm) |
|---|---|---|---|---|
| FIG. 8A | 300 | 2000 | 6.08 | 7.73 |
| FIG. 8B | 600 | 2000 | 10.8 | 13.6 |
| FIG. 8C | 1200 | 2000 | 17.3 | 17.3 |
| FIG. 8D | 2400 | 2000 | 33.3 | 33.3 |

The Glass Substrate/$BaF_2$/$SiN_x$ coated articles had Berkovich indentation hardness values of 17-21 GPa, whereas the uncoated substrate had a hardness of about 7 GPa. Modulus values were measured for these samples and were in the range of 192-212 GPa.

Figure 9:
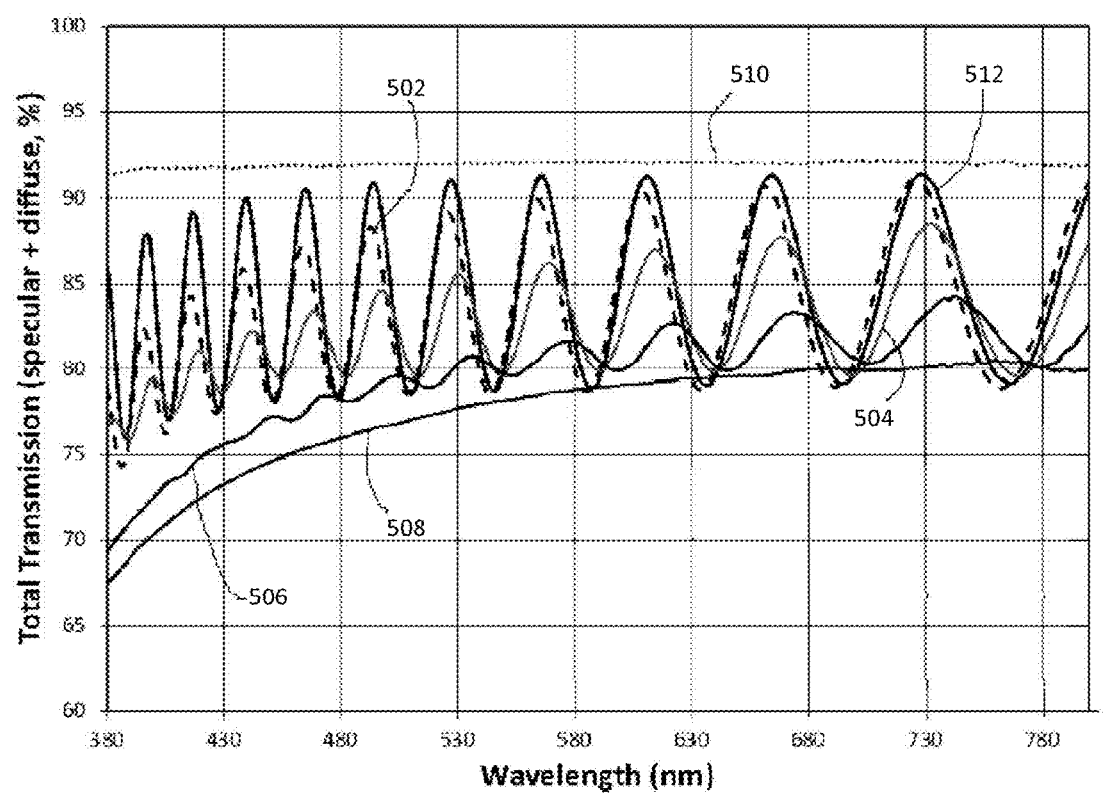
FIG. 9 is a graph depicting total transmittance as a function of wavelength for example coatings, according to one or more embodiments described herein.
Figure 10:
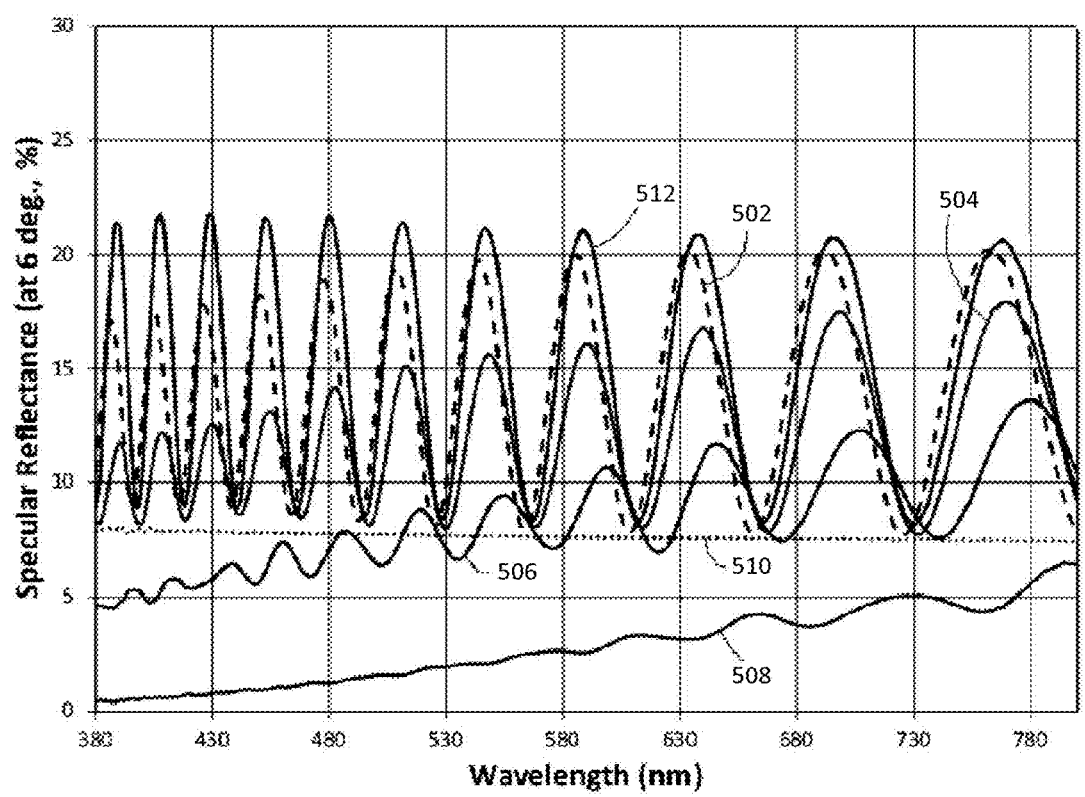
FIG. 10 is a graph depicting specular reflectance as a function of wavelength for example coatings, according to one or more embodiments described herein.

The fabricated samples were evaluated for total transmittance and specular reflectance across the visible spectrum. FIG. 9 depicts the total transmittance (sum of specular and diffuse light) as a function of wavelength. FIG. 10 depicts the specular reflectance (at 6° angle of incidence) as a function of wavelength. In FIGS. 9 and 10, respectively, reference number 502 represents the sample with a 300 nm $BaF_2$ layer and a 2000 nm $SiN_x$ coating, reference number 504 represents the sample with a 300 nm $BaF_2$ layer and a 2000 nm $SiN_x$ coating, number 506 represents the sample with a 300 nm $BaF_2$ layer and a 2000 nm $SiN_x$ coating, and number 508 represents the sample with a 300 nm $BaF_2$ layer and a 2000 nm $SiN_x$ coating. Additionally, reference number 510 represents a comparative example of uncoated substrate and reference number 512 represents a glass substrate coated only with 2 microns of $SiN_x$ (a relatively smooth coating). As shown in FIGS. 9 and 10, the sharp spectral oscillations are smoothed in transmittance as well as in reflection with the addition of a rough layer, and oscillations smooth with increased roughness.

The samples were additionally evaluated for reflective angular color shift (from 6 degrees to 40 degrees with F2 illuminant, the sample measured at 40 degrees being compared to itself when measured at 6 degrees), haze, and total average photopic transmittance with (D65 illuminant). Results are shown in Table 3.

TABLE 3

| $BaF_2$ thickness (nm) | $SiN_x$ thickness (nm) | Angular Color Shift (6° to 40°) | | | Average Photopic Transmittance (D65) |
|---|---|---|---|---|---|
| | | a* | b* | Haze | |
| 300 | 2000 | 1.3 | 3.1 | 2.4 | 83.9 |
| 600 | 2000 | 1.7 | 4.0 | 6.6 | 82.7 |
| 1200 | 2000 | 0.4 | 2.7 | 20.3 | 80.1 |
| 2400 | 2000 | 1.1 | 2.7 | 52 | 78.0 |
| 0 | 0 | 0.01 | 0.05 | 0.2 | 92.0 |
| 0 | 2000 | 2.3 | 5.8 | 0.2 | 84.7 |

While specular reflectance is significantly reduced by the inclusion of a rough $BaF_2$ layer, total transmittance is substantially maintained, only dropping very marginally (from about 85% total photopic average transmittance to about 78% for a 2400 nm thick $BaF_2$ layer, as shown in Table 3. It is believed that thicker layers of $BaF_2$ introduce more light scattering, which smooths the spectral oscillations and reduces the specular reflectance. It is also believed that the reduction in specular reflectance effect is related to the traditional "anti-glare" effect of rough surfaces. Additionally, the samples incorporating the rough $BaF_2$ light scattering centers show a smaller range of variation in reflected color with angular change, due to the spectral smoothing created by the light scattering. The samples with a thicker $BaF_2$ layer have more light scattering and have more spectral smoothing. Depending on the lateral size of the scattering centers, light scattering can also create a color effect (as is well known in Rayleigh or Mie scattering).

What is claimed is:

1. A coated article comprising:
a transparent substrate having a major surface;
an optical coating disposed on the major surface of the transparent substrate and forming an air-side surface, the optical coating comprising one or more layers of deposited material and at least one light-altering feature which reduces oscillations in the reflectance spectrum of the coated article by scattering reflective waves from the coated article;
wherein the coated article exhibits a maximum hardness of about 8 GPa or greater as measured on the air-side surface by a Berkovich Indenter Hardness Test along an indentation depth of about 50 nm or greater;
wherein the coated article has an average photopic transmittance of about 50% or greater; and
wherein the article transmittance color coordinates in the L*a*b* colorimetry system under an International Commission on Illumination illuminant of the coated article exhibits an angular color shift of less than about 10 from an reference illumination angle in the range of 0-10 degrees to an incident illumination angle in the range of 30-60 degrees relative to the air-side surface, where the angular color shift is defined by $\sqrt{((a^*_2-a^*_1)^2+(b^*_2-b^*_1)^2)}$, wherein $a^*_1$, and $b^*_1$ represent the a* and b* coordinates when viewed at a reference illumination angle in the range of 0-10 degrees, and $a^*_2$, and $b^*_2$ represent the a* and b* coordinates when viewed at an incident illumination angle in the range of 30-60 degrees.

2. The coated article of claim 1, wherein the at least one light-altering feature comprises at least one of:
a rough interface between two adjacent layers in the optical coating;
a rough interface between a layer of the optical coating and the substrate; and
a rough air-side surface.

3. The coated article of claim 2, wherein the roughness is characterized by the arithmetic average roughness ($R_a$) of 5 nm or greater.

4. The coated article of claim 2, wherein the roughness is characterized by the root mean squared roughness ($R_q$) of 5 nm or greater.

5. The coated article of claim 1, wherein the at least one light-altering feature comprises light-scattering members disposed between two adjacent layers in the optical coating or between the optical coating and the substrate.

6. The coated article of claim 1, wherein at least one light-altering feature comprises light-scattering members disposed in a layer of the optical coating.

7. The coated article of claim 6, wherein the light-scattering members have an average maximum dimension of from about 1 nm to about 1 micron.

8. The coated article of claim 5, wherein at least some of the light-scattering members are solid particles.

9. The coated article of claim 1, wherein the substrate comprises an amorphous substrate or a crystalline substrate.

10. The coated article of claim 1, wherein the article transmittance color coordinates in the L*a*b* colorimetry system at normal incidence under an International Commission on Illumination illuminant exhibits a reference point color shift of less than about 10 from a reference point as measured at the air-side surface, the reference point comprising the color coordinates (a*=0, b*=0), (a*=−2, b*=−2), or the transmittance color coordinates of the substrate, wherein:
when the reference point is the color coordinates (a*=0, b*=0), the color shift is defined by $\sqrt{((a^*_{article}+(b^*_{article})^2)}$;
when the reference point is the color coordinates (a*=−2, b*=−2), the color shift is defined by $\sqrt{(a^*_{article}+2)^2+(b^*_{article}+2)^2)}$; and
when the reference point is the color coordinates of the substrate, the color shift is defined by $\sqrt{((a^*_{article}-a^*_{substrate})^2+(b^*_{article}-b^*_{substrate})^2)}$.

11. The coated article of claim 1, wherein the coated article has a haze value of about 50% or less.

* * * * *

UNITED STATES PATENT AND TRADEMARK OFFICE
CERTIFICATE OF CORRECTION

PATENT NO. : 10,401,539 B2
APPLICATION NO. : 15/468795
DATED : September 3, 2019
INVENTOR(S) : Robert Alan Bellman et al.

It is certified that error appears in the above-identified patent and that said Letters Patent is hereby corrected as shown below:

In the Claims

In Column 30, Line 51 (approx.), Claim 10, delete "$\sqrt{((a*_{article}+}$" and insert -- $\sqrt{((a*_{article})^2+}$ --, therefor.

In Column 30, Line 54 (approx.), Claim 10, delete "$\sqrt{(a*_{article}+2)^2}$" and insert -- $\sqrt{((a*_{article}+2)^2}$ --, therefor.

Signed and Sealed this
Tenth Day of March, 2020

Andrei Iancu
*Director of the United States Patent and Trademark Office*